United States Patent
Liu et al.

(10) Patent No.: US 10,084,584 B2
(45) Date of Patent: Sep. 25, 2018

(54) INTERFERENCE CANCELLATION APPARATUS AND METHOD

(71) Applicant: Huawei Technologies Co., Ltd., Shenzhen (CN)

(72) Inventors: Sheng Liu, Shenzhen (CN); Teyan Chen, Shenzhen (CN); Yu Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/390,257

(22) Filed: Dec. 23, 2016

(65) Prior Publication Data

US 2017/0111155 A1    Apr. 20, 2017

Related U.S. Application Data

(63) Continuation of application No. PCT/CN2014/080864, filed on Jun. 26, 2014.

(51) Int. Cl.
*H04L 5/00* (2006.01)
*H04L 5/14* (2006.01)
(Continued)

(52) U.S. Cl.
CPC .......... *H04L 5/0055* (2013.01); *H04L 5/0005* (2013.01); *H04L 5/14* (2013.01);
(Continued)

(58) Field of Classification Search
CPC ....... H04L 5/0005; H04L 5/0055; H04L 5/14; H04L 25/03; H04W 72/082; H04W 84/12;
(Continued)

(56) References Cited

U.S. PATENT DOCUMENTS

| 5,691,978 A | 11/1997 | Kenworthy |
| 6,229,992 B1 | 5/2001 | McGeehan et al. |

(Continued)

FOREIGN PATENT DOCUMENTS

| CN | 101453228 A | 6/2009 |
| CN | 101656562 A | 2/2010 |

(Continued)

OTHER PUBLICATIONS

Youxi, "Co-frequency Co-time Full Duplex Test Bed," Powerpoint, National Communication Lab (May 28, 2013).

(Continued)

*Primary Examiner* — Ahmed Elallam
(74) *Attorney, Agent, or Firm* — Leydig, Voit & Mayer, Ltd.

(57) ABSTRACT

Embodiments of the present invention relate to the field of communications technologies, and provide an interference cancellation apparatus and method, which can avoid being limited by a dynamic range of an ADC/DAC and can cancel a second-type self-interference component effectively. The interference cancellation apparatus includes a main receive antenna, a divider, a first-type interference canceller, a down converter, a filter, a coupler, a digital down-conversion unit, a second-type interference reconstructor, and a local-frequency signal generator. The present invention is used for interference cancellation.

20 Claims, 10 Drawing Sheets

(51) Int. Cl.
*H04W 72/08* (2009.01)
*H04W 84/12* (2009.01)
*H04W 88/08* (2009.01)
*H04W 88/02* (2009.01)

(52) U.S. Cl.
CPC .......... *H04W 72/082* (2013.01); *H04W 84/12* (2013.01); *H04W 88/02* (2013.01); *H04W 88/08* (2013.01)

(58) Field of Classification Search
CPC ........ H04W 88/02; H04W 88/08; H04B 1/10; H04B 1/109; H04B 1/525; H04B 7/15585
See application file for complete search history.

(56) References Cited

U.S. PATENT DOCUMENTS

| | | | |
|---|---|---|---|
| 7,729,431 B2 | 6/2010 | Gebara et al. | |
| 7,804,760 B2 | 9/2010 | Schmukler et al. | |
| 8,249,540 B1 | 8/2012 | Gupta et al. | |
| 8,977,223 B1 | 3/2015 | Gupta et al. | |
| 9,019,849 B2 | 4/2015 | Hui et al. | |
| 9,100,110 B2 | 8/2015 | Wang et al. | |
| 9,124,332 B2 | 9/2015 | Wang et al. | |
| 9,270,308 B2* | 2/2016 | Chen | H04B 1/525 |
| 9,312,895 B1 | 4/2016 | Gupta et al. | |
| 9,337,885 B2* | 5/2016 | Mehlman | H04B 1/10 |
| 9,407,377 B2* | 8/2016 | Young | H04B 3/54 |
| 9,813,168 B2* | 11/2017 | Mo | H04B 1/123 |
| 9,912,374 B2* | 3/2018 | Zhang | H04B 3/238 |
| 2003/0098806 A1 | 5/2003 | Green | |
| 2007/0184782 A1* | 8/2007 | Sahota | H04B 1/10 455/63.1 |
| 2008/0008126 A1 | 1/2008 | Shirakabe et al. | |
| 2008/0107046 A1* | 5/2008 | Kangasmaa | H04B 1/12 370/278 |
| 2011/0285508 A1* | 11/2011 | Kim | H04B 1/1036 340/10.1 |
| 2011/0300914 A1* | 12/2011 | Gudem | H04B 1/1027 455/574 |
| 2012/0002586 A1 | 1/2012 | Gainey et al. | |
| 2013/0301487 A1 | 11/2013 | Khandani et al. | |
| 2014/0016515 A1 | 1/2014 | Jana et al. | |
| 2014/0348018 A1 | 11/2014 | Bharadia et al. | |
| 2015/0156001 A1 | 6/2015 | Lin et al. | |
| 2015/0180640 A1 | 6/2015 | Liu | |
| 2015/0212194 A1* | 7/2015 | Obiya | H04B 1/525 342/175 |
| 2016/0105211 A1* | 4/2016 | Kim | H04L 27/01 370/278 |
| 2016/0226653 A1 | 8/2016 | Bharadia et al. | |
| 2016/0277063 A1* | 9/2016 | Liu | H04B 1/525 |
| 2016/0277166 A1* | 9/2016 | Liu | H04L 25/03006 |
| 2016/0285502 A1 | 9/2016 | Liu | |
| 2017/0005773 A1 | 1/2017 | Liu et al. | |
| 2017/0085398 A1* | 3/2017 | Liu | H04L 5/0048 |
| 2017/0104506 A1* | 4/2017 | Liu | H04B 1/1027 |
| 2017/0111155 A1 | 4/2017 | Liu et al. | |

FOREIGN PATENT DOCUMENTS

| | | |
|---|---|---|
| CN | 103139115 A | 6/2013 |
| CN | 103200140 A | 7/2013 |
| CN | 103297069 A | 9/2013 |
| CN | 103427872 A | 12/2013 |
| CN | 103427874 A | 12/2013 |
| CN | 103580720 A | 2/2014 |
| CN | 103685098 A | 3/2014 |
| CN | 103701480 A | 4/2014 |
| EP | 3068055 A1 | 9/2016 |
| JP | 10190361 A | 7/1998 |
| JP | 2001196994 A | 7/2001 |
| JP | 2013532447 A | 8/2013 |
| KR | 19990060622 A | 7/1999 |
| KR | 20000009734 U | 6/2000 |
| KR | 20130061326 A | 6/2013 |
| RU | 2005141504 A | 8/2006 |
| SU | 675382 A1 | 7/1979 |
| WO | 2004107596 A1 | 12/2004 |
| WO | WO 2009114638 A1 | 9/2009 |
| WO | 2014036930 A1 | 3/2014 |
| WO | WO 2014061443 A1 | 4/2014 |
| WO | 2014108098 A1 | 7/2014 |
| WO | 2015048678 A1 | 4/2015 |

OTHER PUBLICATIONS

Duarte et al., "Design and Characterization of a Full-Duplex Multiantenna System for WiFi Networks," IEEE Transactions on Vehicular Technology, vol. 63, No. 3, pp. 1160-1177, Institute of Electrical and Electronic Engineers (Mar. 2014).
Bharadia et al., "Full Duplex MIMO Radios," Stanford University (2014).
Bharadia et al., "Full Duplex Radios," Stanford University (2013).
MAXIM; Single-/Dual-Band 802.11a/b/g World-Band Transceiver ICs, pp. 1-39 (2004).
Jain et al., "Practical, Real-time, Full Duplex Wireless," Stanford University (2011).

* cited by examiner

INTERFERENCE CANCELLATION APPARATUS AND METHOD

CROSS-REFERENCE TO RELATED APPLICATIONS

This application is a continuation of International Application No. PCT/CN2014/080864, filed on Jun. 26, 2014, the disclosure of which is hereby incorporated by reference in its entirety.

TECHNICAL FIELD

Embodiments of the present invention relate to the field of communications technologies, and in particular, to an interference cancellation apparatus and method.

BACKGROUND

In a wireless communications system such as a mobile cellular communications system, a wireless local area network (WLAN), or fixed wireless access (FWA), communications nodes such as a base station (BS) or an access point (AP), a relay station (RS), and user equipment (UE) are generally capable of transmitting their own signals and receiving signals from other communications nodes. Because a radio signal is attenuated greatly in a radio channel, in comparison with a transmit signal of a local transmitting end, a signal coming from a communications peer becomes very weak when the signal arrives at a receive end. For example, a power difference between transmit power and receive power of a communications node in a mobile cellular communications system may be up to 80 dB to 140 dB or even greater. Therefore, to avoid self-interference caused by a transmit signal of a transceiver to a receive signal of the transceiver, radio signal transmission and reception are generally differentiated by using different frequency bands or different time periods. For example, in frequency division duplex (FDD) system, for transmission and reception, communication is performed by using different frequency bands separated by a guard band; in time division duplex (TDD) system, for transmission and reception, communication is performed by using different time periods separated by a certain guard period, where the guard band in the FDD system and the guard period in the TDD system are both used to ensure that reception and transmission are fully isolated and to avoid interference caused by transmission to reception.

Different from the conventional FDD or TDD technology, a wireless full duplex technology may implement operations of reception and transmission simultaneously on a same radio channel. In this way, spectral efficiency of the wireless full duplex technology is theoretically twice that of the FDD or TDD technology. Apparently, a precondition for implementing wireless full duplex lies in that strong interference (referred to as self-interference) caused by a transmit signal of a transceiver to a receive signal of the transceiver is avoided, reduced, or canceled as much as possible, so that no adverse impact is caused to proper reception of a wanted signal.

In a full duplex system, self-interference entering a receiver mainly includes two types of self-interference components.

A first-type self-interference component is a main-path self-interference component, and its power is relatively high. The main-path self-interference component mainly includes a self-interference signal that is leaked from a transmit end to a receive end due to leakage of a circulator, and a self-interference signal that enters the receive end due to antenna echo reflection. Conventional passive radio frequency self-interference cancellation is mainly used to cancel the first-type self-interference component. A path delay, power, and phase of component depend on hardware itself such as an intermediate radio frequency unit and an antenna and a feeder of a specific transceiver. The path delay, power, and phase are basically fixed or change slowly, and it is unnecessary to perform fast tracing on each interference path of the first-type self-interference component.

A second-type self-interference component is mainly a self-interference component that is formed after a transmit signal is transmitted by a transmit antenna and encounters multi-path reflection at a scatterer or a reflection plane or the like in a spatial propagation process. When the full duplex technology is applied to scenarios such as a base station and a relay station in a cellular system, and a Wi-Fi access point (AP) disposed outdoors, because antennas of the devices are generally mounted relatively high, and there are few scatterers or reflection planes within a range of several meters to tens of meters around the devices, multi-path delays of multi-path reflected self-interference components that undergo spatial propagation, in the signals received by the devices, are relatively great and widely distributed, and with an increase in delays, power of corresponding multi-path signals (signals reflected from scatterers or reflection planes or the like that are far away) tends to decrease.

In the prior art, generally, an apparatus having a structure shown in FIG. 1 is used to cancel the second-type self-interference component in a manner of active analog self-interference cancellation or digital baseband self-interference cancellation. Specifically, a baseband digital self-interference signal reconstructed in a digital domain is reconverted to an analog domain by using a digital to analog converter (DAC), and then undergoes analog baseband processing (not shown in the figure) in the analog domain or is up-converted to an intermediate radio frequency, and is used to cancel a self-interference signal included in an analog receive signal; digital baseband self-interference cancellation in the digital domain is to use a reconstructed baseband digital self-interference signal to directly cancel a self-interference signal included in a digital receive signal in the digital domain. However, self-interference cancellation performance of the apparatus is finally limited by a dynamic range of an ADC (Analog-to-Digital Converter)/DAC (Digital-to-Analog Converter). Generally, the dynamic range of the ADC/DAC is about 60 dB. Therefore, when power of the second-type self-interference component is 60 dB higher than that of a wanted signal, the conventional method cannot be used to effectively cancel the second-type self-interference component.

SUMMARY

Embodiments of the present invention provide an interference cancellation apparatus and method, which can avoid being limited by a dynamic range of an ADC/DAC and can cancel a second-type self-interference component effectively.

According to a first aspect, an interference cancellation apparatus is provided, including:

a main receive antenna (110), configured to receive a radio frequency signal, and transmit the received radio frequency signal to a first-type interference canceller (130);

a divider (120), configured to acquire a radio frequency reference signal generated according to a transmit signal, and transmit the radio frequency reference signal to the first-type interference canceller (130) and a second-type interference reconstructor (180);

the first-type interference canceller (130), configured to receive the radio frequency reference signal transmitted by the divider (120) and the received radio frequency signal transmitted by the main receive antenna (110), and cancel a first-type self-interference component in the received radio frequency signal according to the radio frequency reference signal to acquire a first processed signal, where the first-type self-interference component includes a main-path self-interference component;

a local-frequency signal generator (190), configured to acquire a self-interference channel parameter acquired by the second-type interference reconstructor (180), and generate the first local-frequency signal and the second local-frequency signal according to the self-interference channel parameter;

a down converter (140), configured to receive the first local-frequency signal generated by the local-frequency signal generator (190) and the first processed signal acquired by the first-type interference canceller (130), and perform frequency mixing processing on the first local-frequency signal and the first processed signal to acquire a second processed signal;

a filter (150), configured to receive the second processed signal, and perform filtering processing on the second processed signal to acquire a third processed signal;

the second-type interference reconstructor (180), configured to acquire the second local-frequency signal generated by the local-frequency signal generator (190) and the radio frequency reference signal acquired by the divider (120), and reconstruct the self-interference signal according to the self-interference channel parameter, the radio frequency reference signal, and the second local-frequency signal;

a coupler (160), configured to receive the third processed signal acquired by the filter (150) and the reconstructed self-interference signal transmitted by the second-type interference reconstructor (180), and cancel a second-type self-interference signal in the third processed signal according to the reconstructed self-interference signal to generate a fourth processed signal; and a digital down-conversion unit (170), configured to receive the fourth processed signal, convert the fourth processed signal into a digital signal, and perform digital down-conversion processing on the digital signal to acquire a fifth processed signal; where the second-type interference reconstructor (180) is further configured to acquire a digital baseband reference signal, receive the fifth processed signal transmitted by the digital down-conversion unit (170), and perform self-interference channel estimation according to the fifth processed signal and the digital baseband reference signal to acquire the self-interference channel parameter.

With reference to the first aspect, in a first possible implementation manner, the second-type interference reconstructor (180) includes:

a self-interference estimation module (1801), configured to acquire the digital baseband reference signal, receive the fifth processed signal transmitted by the digital down-conversion unit (170), and perform self-interference channel estimation according to the digital baseband reference signal and the fifth processed signal to acquire the self-interference channel parameter; and a self-interference signal reconstruction module (1802), configured to acquire the second local-frequency signal generated by the local-frequency signal generator (190), receive the radio frequency reference signal acquired by the divider (120) and the self-interference channel parameter acquired by the self-interference estimation module (1801), and reconstruct the self-interference signal according to the self-interference channel parameter, the radio frequency reference signal, and the second local-frequency signal.

With reference to the first aspect, in a second possible implementation manner, the apparatus further includes a first amplifier, where the first amplifier is configured to amplify the fourth processed signal.

With reference to the first aspect, in a third possible implementation manner, the apparatus further includes a second amplifier and a third amplifier, where:

the second amplifier is configured to amplify the first processed signal; and the third amplifier is configured to amplify the reconstructed self-interference signal.

With reference to the first aspect, in a fourth possible implementation manner, the apparatus further includes a second amplifier and a fourth amplifier, where:

the second amplifier is configured to amplify the first processed signal; and the fourth amplifier is configured to amplify the radio frequency reference signal received by the second-type interference reconstructor.

With reference to the first possible implementation manner of the first aspect, in a fifth possible implementation manner, the self-interference signal reconstruction module (1802) includes:

a first power divider, a first attenuator group, a first mixer group, a first low-pass filter group, and a first delayer group, where:

the first power divider is configured to receive the radio frequency reference signal, and divide the radio frequency reference signal into at least one signal;

the first attenuator group includes at least one attenuator, where the attenuator is configured to perform attenuation processing on one of the at least one radio frequency reference signal according to the self-interference channel parameter;

the first mixer group includes at least one mixer, where the mixer is configured to perform, according to the second local-frequency signal, frequency mixing processing on one of the radio frequency reference signal after attenuation processing;

the first low-pass filter group includes at least one low-pass filter, where the low-pass filter is configured to perform filtering processing on one of the radio frequency reference signal after frequency mixing processing; and the first delayer group includes at least one delayer and at least one combiner, where:

the at least one delayer is connected in series by using a first input end and an output end of a combiner, an input end of a first delayer and a second input end of the combiner are configured to input one radio frequency reference signal after filtering processing, and an input end of a last combiner is configured to output the reconstructed self-interference signal.

With reference to the first possible implementation manner of the first aspect, in a sixth possible implementation manner, the self-interference signal reconstruction module (1802) includes:
 a second power divider, a second mixer group, a second low-pass filter group, a second attenuator group, and a second delayer group, where:
 the second power divider is configured to receive the radio frequency reference signal, and divide the radio frequency reference signal into at least one signal;
 the second mixer group includes at least one mixer, where the mixer is configured to perform frequency mixing processing on one of the radio frequency reference signal according to the second local-frequency signal;
 the second low-pass filter group includes at least one low-pass filter, where the low-pass filter is configured to perform filtering processing on one of the radio frequency reference signal after frequency mixing processing;
 the second attenuator group includes at least one attenuator, where the attenuator is configured to perform, according to the self-interference channel parameter, attenuation processing on one of the radio frequency reference signal after filtering processing; and
 the second delayer group includes at least one delayer and at least one combiner, where:
 the at least one delayer is connected in series by using a first input end and an output end of a combiner, an input end of a first delayer and a second input end of the combiner are configured to input one radio frequency reference signal after attenuation processing, and an input end of a last combiner is configured to output the reconstructed self-interference signal.

With reference to the first aspect, in a seventh possible implementation manner, the local-frequency signal generator (190) includes a local-frequency signal source, a third power divider, and a phase shifter group, where:
 the third power divider is configured to divide a local-frequency signal transmitted by the local-frequency signal source into at least one local-frequency signal, where one local-frequency signal is used as the first local-frequency signal, and the other local-frequency signals are input to the phase shifter group; and
 the phase shifter group includes at least one phase shifter, where the phase shifter is configured to perform phase shift processing on one local-frequency signal according to the self-interference channel parameter, and the phase shifter group uses each local-frequency signal obtained after phase shift processing as the second local-frequency signal.

With reference to the first aspect or any possible implementation manner of the first aspect, in an eighth possible implementation manner, the first-type interference canceller (130) is specifically configured to perform, based on the received radio frequency signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the received radio frequency signal, and that a phase of the radio frequency reference signal is the same or approximately the same as a phase of the first-type self-interference component in the received radio frequency signal; or
 perform, based on the received radio frequency signal, delay processing, amplitude adjustment processing, and phase adjustment processing on the radio frequency reference signal, so that an amplitude of the radio frequency reference signal is the same or approximately the same as an amplitude of the first-type self-interference component in the received radio frequency signal, and that a difference between a phase of the reference signal and a phase of the first-type self-interference component in the received radio frequency signal is 180 degrees or approximately 180 degrees.

With reference to the first aspect or any possible implementation manner of the first aspect, in a ninth possible implementation manner, the transmit signal includes a self-interference channel estimation timeslot and a data transmission timeslot that are disposed at an interval.

According to a second aspect, an interference cancellation method is provided, including:
 acquiring a radio frequency reference signal generated according to a transmit signal;
 receiving a radio frequency signal by using a main receive antenna;
 canceling a first-type self-interference component in the received radio frequency signal according to the radio frequency reference signal, to generate a first processed signal, where the first-type self-interference component includes a main-path self-interference component;
 generating a first local-frequency signal and a second local-frequency signal according to a self-interference channel parameter;
 performing frequency mixing processing on the first local-frequency signal and the first processed signal to acquire a second processed signal;
 performing filtering processing on the second processed signal to acquire a third processed signal;
 acquiring the reconstructed self-interference signal according to the self-interference channel parameter, the radio frequency reference signal, and the second local-frequency signal;
 canceling a second-type self-interference signal in the third processed signal according to the reconstructed self-interference signal to generate a fourth processed signal;
 converting the fourth processed signal into a digital signal, and performing digital down-conversion processing on the digital signal to acquire a fifth processed signal; and
 performing self-interference channel estimation according to the fifth processed signal and a digital baseband reference signal to acquire the self-interference channel parameter.

With reference to the second aspect, in a first possible implementation manner, the method further includes: amplifying the fourth processed signal.

With reference to the second aspect, in a second possible implementation manner, the method further includes:
 amplifying the first processed signal; and
 amplifying the reconstructed self-interference signal.

With reference to the second aspect, in a third possible implementation manner, the method further includes:
 amplifying the first processed signal; and
 before the acquiring the reconstructed self-interference signal according to the self-interference channel parameter, the radio frequency reference signal, and the second local-frequency signal, amplifying the radio frequency reference signal.

With reference to the second aspect, in a fourth possible implementation manner, the acquiring the reconstructed self-interference signal according to the self-interference channel parameter, the radio frequency reference signal, and the second local-frequency signal includes:

dividing the radio frequency reference signal into at least one signal;

performing attenuation processing on each radio frequency reference signal according to the self-interference channel parameter;

performing, according to the second local-frequency signal, frequency mixing processing on each the radio frequency reference signal after attenuation processing;

performing filtering processing on each radio frequency reference signal after frequency mixing processing; and performing delay processing on each radio frequency reference signal after filtering processing, and performing combination to reconstruct the self-interference signal.

With reference to the second aspect, in a fifth possible implementation manner, the acquiring the reconstructed self-interference signal according to the self-interference channel parameter, the radio frequency reference signal, and the second local-frequency signal includes:

dividing the radio frequency reference signal into at least one signal;

performing frequency mixing processing on each of the radio frequency reference signal according to the second local-frequency signal;

performing filtering processing on each of the radio frequency reference signal after frequency mixing processing;

performing, according to the self-interference channel parameter, attenuation processing on each of the radio frequency reference signal after filtering processing; and performing delay processing on each of the radio frequency reference signal after attenuation processing, and combing the radio frequency reference signal to reconstruct the self-interference signal.

With reference to the second aspect, in a sixth possible implementation manner, the generating the first local-frequency signal and the second local-frequency signal according to a self-interference channel parameter includes:

dividing a local-frequency signal into at least one local-frequency signal, where one local-frequency signal is used as the first local-frequency signal; and performing phase shift processing on each local-frequency signal except the first local-frequency signal according to the self-interference channel parameter to generate the second local-frequency signal.

With reference to the second aspect or any possible implementation manner of the second aspect, in a seventh possible implementation manner, the performing interference cancellation processing on the received radio frequency signal according to the radio frequency reference signal includes:

performing, based on the received radio frequency signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the received radio frequency signal, and that a phase of the radio frequency reference signal is the same or approximately the same as a phase of the first-type self-interference component in the received radio frequency signal; or performing, based on the received radio frequency signal, delay processing, amplitude adjustment processing, and phase adjustment processing on the radio frequency reference signal, so that an amplitude of the radio frequency reference signal is the same or approximately the same as an amplitude of the first-type self-interference component in the received radio frequency signal, and that a difference between a phase of the reference signal and a phase of the first-type self-interference component in the received radio frequency signal is 180 degrees or approximately 180 degrees.

With reference to the second aspect or any possible implementation manner of the second aspect, in an eighth possible implementation manner, the transmit signal includes a self-interference channel estimation timeslot and a data transmission timeslot that are disposed at an interval.

According to the interference cancellation apparatus and method provided in the embodiments of the present invention, for a received radio frequency signal acquired by a main receive antenna, interference cancellation processing is performed according to a radio frequency reference signal to cancel a first-type self-interference component in the received radio frequency signal and acquire a first processed signal; and further, after down-conversion processing is performed on the first processed signal, a self-interference signal is reconstructed through self-interference channel estimation to cancel a second-type self-interference component in the first processed signal. Because the reconstructed self-interference signal is used directly in an analog domain to cancel the second-type self-interference component, a limitation by a dynamic range of an ADC/DAC can be avoided, and the second-type self-interference component can be canceled effectively.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

REFERENCE SIGNS IN THE DRAWINGS

Figure 1:
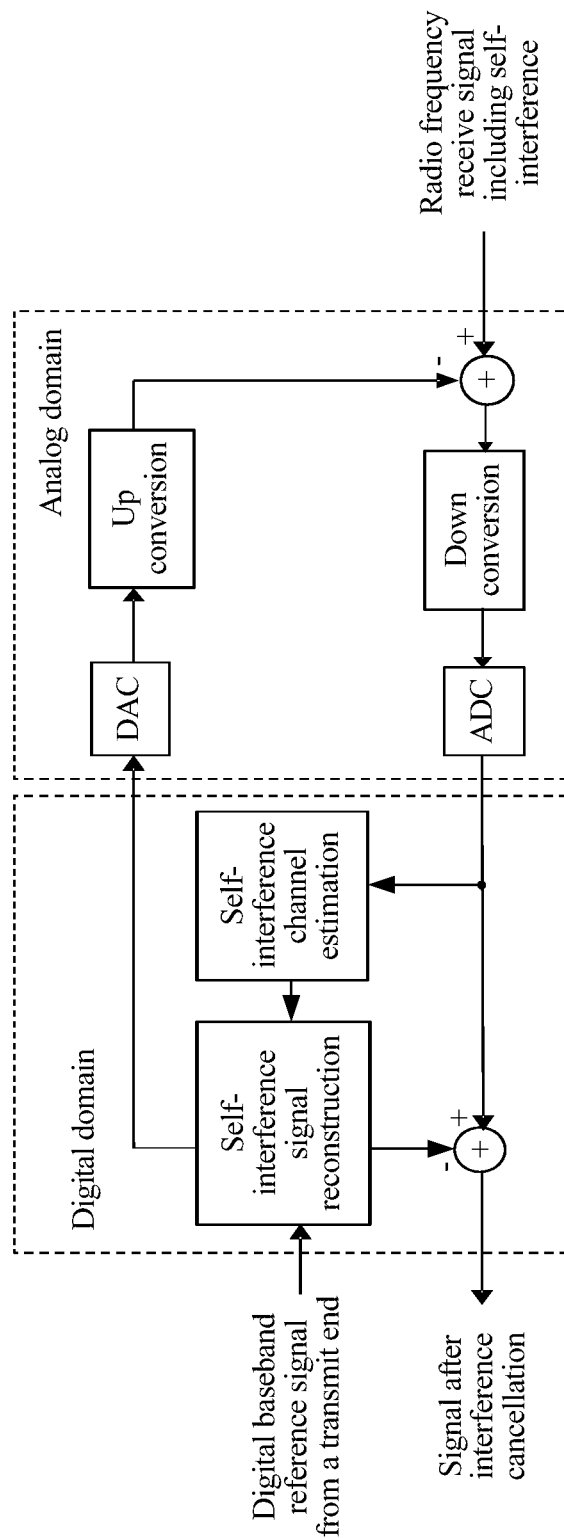
FIG. 1 is a schematic structural diagram of an interference cancellation apparatus according to the prior art.

110—main receive antenna
120—divider
130—first-type interference canceller
140—down converter
150—filter
160—coupler
170—digital down-conversion unit
180—second-type interference reconstructor
1801—self-interference estimation module
1802—self-interference signal reconstruction module
190—local-frequency signal generator

DESCRIPTION OF EMBODIMENTS

Multiple embodiments are described with reference to the accompanying drawings, and same parts in this specification are indicated by a same reference sign. In the following description, for ease of explanation, many specific details are provided to facilitate comprehensive understanding of one or more embodiments. However, apparently, the embodiments may also not be implemented by using these specific details. In other examples, a well-known structure and device are shown in a form of block diagrams, to conveniently describe one or more embodiments.

Terminologies such as "part", "module", and "system" used in this specification are used to indicate computer-related entities, hardware, firmware, combinations of hardware and software, software, or software being executed. For example, a part may be, but is not limited to, a process that runs on a processor, a processor, an object, an executable file, a thread of execution, a program, and/or a computer. As shown in figures, both a computing device and an application that runs on a computing device may be parts. One or more parts may reside within a process and/or a thread of execution, and a part may be located on one computer and/or distributed between two or more computers. In addition, these parts may be executed from various computer-readable media that store various data structures. For example, the parts may communicate by using a local and/or remote process and according to, for example, a signal having one or more data packets.

An interference cancellation apparatus according to an embodiment of the present invention may be disposed in an access terminal that uses a wireless full duplex technology, or itself may be an access terminal that uses a wireless full duplex technology. An access terminal may also be referred to as a system, a subscriber unit, a subscriber station, a mobile station, a mobile, a remote station, a remote terminal, a mobile device, a user terminal, a terminal, a wireless communications device, user agent, a user apparatus, or user equipment (UE). The access terminal may be a cellular phone, a cordless phone, a SIP (Session Initiation Protocol) phone, a WLL (Wireless Local Loop) station, a PDA (Personal Digital Assistant), a handheld device having a wireless communication function, an in-vehicle device, a wearable device, a computing device, or another processing device connected to a wireless modem.

In addition, the interference cancellation apparatus according to the embodiment of the present invention may also be disposed in a base station that uses the wireless full duplex technology, or itself may be a base station that uses the wireless full duplex technology. The base station may be configured to communicate with a mobile device. The base station may be an AP (Access Point) of Wi-Fi, or a BTS (Base Transceiver Station) in a GSM (Global System for Mobile Communications) or a CDMA (Code Division Multiple Access) system, or may be an NB (NodeB) in a WCDMA (Wideband Code Division Multiple Access) system, or may be an eNB or an eNodeB (evolved NodeB) in an LTE (Long Term Evolution) system, or a relay station or an access point, or a base station device in a future 5G network, or the like.

In addition, aspects or features of the present invention may be implemented as an apparatus or a product that uses standard programming and/or engineering technologies. The term "product" used in this application covers a computer program that can be accessed from any computer-readable part, carrier or medium. For example, the computer-readable medium may include but is not limited to: a magnetic storage part (for example, a hard disk, a floppy disk or a magnetic tape), an optical disc (for example, a CD (Compact Disk), a DVD (Digital Versatile Disk), a smart card and a flash memory part (for example, EPROM (Erasable Programmable Read-Only Memory), a card, a stick, or a key drive). In addition, various storage media described in this specification may indicate one or more devices and/or other machine-readable media that is used to store information. The term "machine-readable media" may include but is not limited to a radio channel, and various other media that can store, include and/or carry an instruction and/or data.

It should be noted that in the embodiments of the present invention, interference cancellation may be canceling all interference components in a signal (including a first-type self-interference component and a second-type self-interference component), or may be canceling some interference components in a signal (including a part of a first-type self-interference component and a part of a second-type self-interference component).

Figure 2:
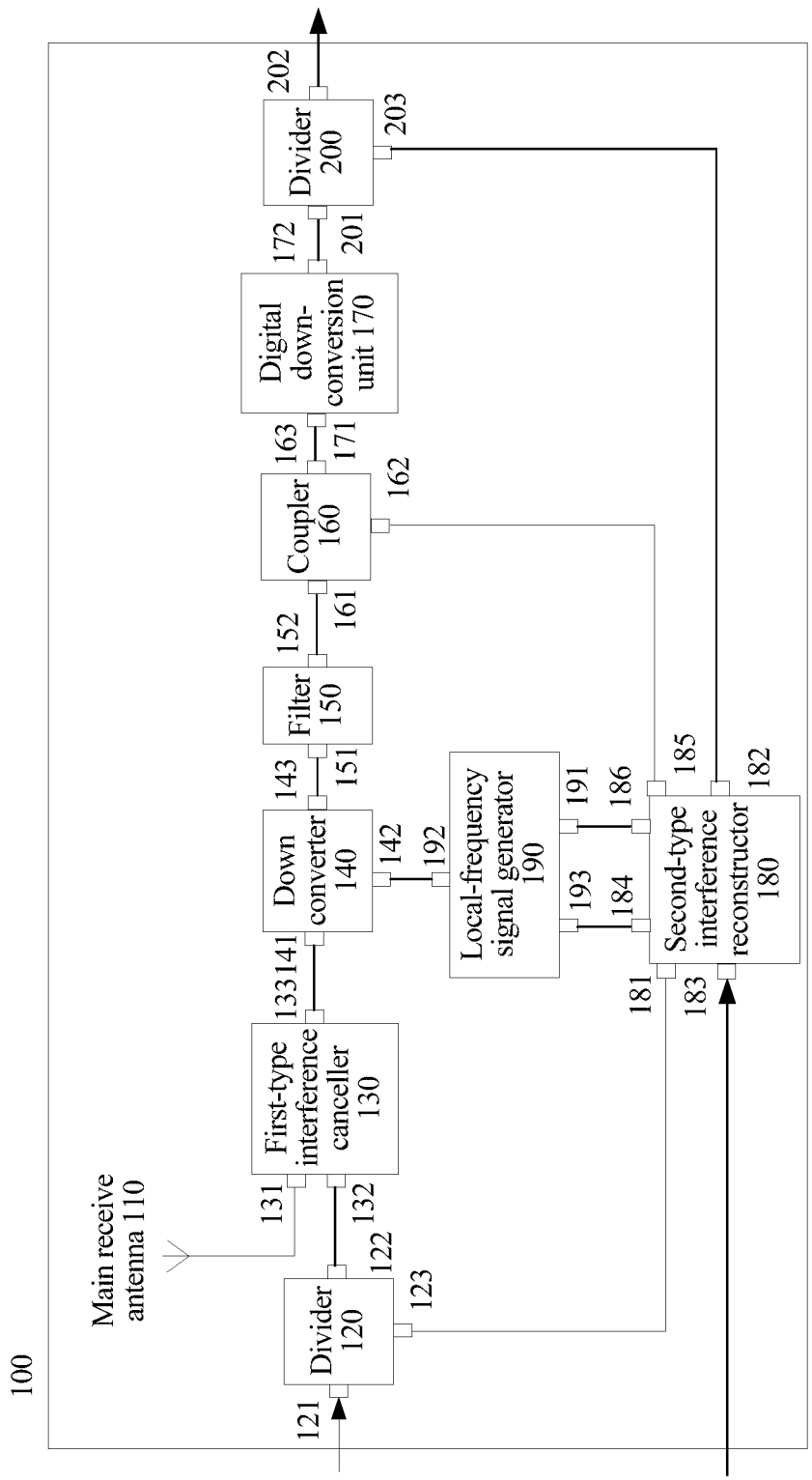
FIG. 2 is a schematic structural diagram of an interference cancellation apparatus according to an embodiment of the present invention.

FIG. 2 is a schematic structural diagram of an interference cancellation apparatus according to an embodiment of the present invention. As shown in FIG. 2, an apparatus (100) provided by this embodiment includes:

a main receive antenna (110), a divider (120), a first-type interference canceller (130), a down converter (140), a filter (150), a coupler (160), a digital down-conversion unit (170), a second-type interference reconstructor (180), and a local-frequency signal generator (190), where: an output end of the main receive antenna (110) is connected to a first input end (131) of the first-type interference canceller (130); an input end (121) of the divider (120) is configured to acquire a radio frequency reference signal generated according to a transmit signal; a first output end (122) of the divider (120) is connected to a second input end (132) of the first-type interference canceller (130); an output end (133) of the first-type interference canceller (130) is connected to a first input end (141) of the down converter (140); a second output end (123) of the divider (120) is connected to a first input end (181) of the second-type interference reconstructor (180); a second input end (142) of the down converter (140) is connected to a first output end (192) of the local-frequency signal generator (190); an input end (151) of the filter (150) is connected to an output end (143) of the down converter (140); an output end (152) of the filter (150) is connected to a first input end (161) of the coupler (160); a second input end (162) of the coupler (160) is connected to a first output end (185) of the second-type interference reconstructor (180); an output end (163) of the coupler (160) is connected to an input end (171) of the digital down-conversion unit (170); an output end (172) of the digital down-conversion unit (170) is connected to a second input end (182) of the second-type interference reconstructor (180); a third input end (183) of the second-type interference reconstructor (180) is configured to input a digital baseband reference signal; a fourth input end (184) of the second-type interference reconstructor (180) is connected to a second output end (193) of the local-frequency signal generator (190); and an input end (191) of the local-frequency signal generator (190) is connected to a second output end (186) of the second-type interference reconstructor (180).

Specifically, FIG. 2 further shows a divider (200). Because a fifth processed signal output by the output end (172) of the digital down-conversion unit (170) is used as a baseband receive signal, and at the same time the fifth processed signal is used as an input signal of the second-type interference reconstructor (180), the divider (200) needs to be used to divide the fifth processed signal. Specifically, a connection relationship of the divider (200) is as follows: An input end (201) of the divider (200) is connected to the output end (172) of the digital down-conversion unit (170), a first output end (202) of the divider (200) outputs the fifth processed signal, and a third output end (203) of the divider (200) is connected to the second input end 182 of the second-type interference reconstructor (180).

Functions of parts in the embodiment shown in FIG. 2 are described as follows:

The main receive antenna (110) is configured to receive a radio frequency signal, and transmit the received radio frequency signal to the first-type interference canceller (130).

The divider (120) is configured to acquire a radio frequency reference signal generated according to a transmit signal, and transmit the radio frequency reference signal to the first-type interference canceller (130) and the second-type interference reconstructor (150).

The first-type interference canceller (130) is configured to receive the radio frequency reference signal transmitted by the divider (120) and the received radio frequency signal transmitted by the main receive antenna (110), and cancel a first-type self-interference component in the received radio frequency signal according to the radio frequency reference signal to acquire a first processed signal, where the first-type self-interference component includes a main-path self-interference component.

The local-frequency signal generator (190) is configured to acquire a self-interference channel parameter acquired by the second-type interference reconstructor (180), and generate the first local-frequency signal and the second local-frequency signal according to the self-interference channel parameter.

The down converter (140) is configured to receive the first local-frequency signal generated by the local-frequency signal generator (190) and the first processed signal acquired by the first-type interference canceller (130), and perform frequency mixing processing on the first local-frequency signal and the first processed signal to acquire a second processed signal.

The filter (150) is configured to receive the second processed signal, and perform filtering processing on the second processed signal to acquire a third processed signal.

The second-type interference reconstructor (180) is configured to acquire the second local-frequency signal generated by the local-frequency signal generator (190) and the radio frequency reference signal acquired by the divider (120), and the self-interference signal is reconstructed according to the self-interference channel parameter, the radio frequency reference signal, and the second local-frequency signal.

The coupler (160) is configured to receive the third processed signal acquired by the filter (150) and the reconstructed self-interference signal transmitted by the second-type interference reconstructor (180), and cancel a second-type self-interference signal in the third processed signal according to the reconstructed self-interference signal to generate a fourth processed signal.

The digital down-conversion unit (170) is configured to receive the fourth processed signal, convert the fourth processed signal into a digital signal, and perform digital down-conversion processing on the digital signal to acquire a fifth processed signal.

The second-type interference reconstructor (180) is further configured to acquire a digital baseband reference signal, receive the fifth processed signal transmitted by the digital down-conversion unit (170), and perform self-interference channel estimation according to the fifth processed signal and the digital baseband reference signal to acquire the self-interference channel parameter.

Connection relationships, structures, and functions of parts in the embodiment shown in FIG. 2 are described in detail as follows:

(1) Main Receive Antenna (110)

configured to receive a radio signal, and input the received radio signal as a received radio frequency signal to the first input end (131) of the first-type interference canceller 130, where the process of receiving a radio signal by the main receive antenna 110 may be similar to the process of receiving a radio signal by an antenna in the prior art, and is not further described herein for avoiding repetition.

(2) Divider (120)

Specifically, in the embodiment of the present invention, for example, a coupler or a power divider may be used as the divider (120).

In addition, because a radio frequency reference signal is acquired according to a transmit signal from a transmitter, a transmit signal obtained after baseband processing, for example, may be used as a radio frequency reference signal, and input to the divider (120) through the input end (121) of the divider (120).

Therefore, the divider (120) can divide the radio frequency reference signal into two signals. One signal is transmitted to the second input end (132) of the first-type interference canceller (130) through the first output end (122) of the divider (120) and is received by the first-type interference canceller (130). The other signal is transmitted to the first input end (181) of the second-type interference reconstructor (180) through the second output end (123) of the divider (120) and is received by the second-type interference reconstructor (180).

The coupler or power divider is used as the divider (120) in such a manner that waveforms of the two signals output from the divider (120) can be consistent with that of the radio frequency reference signal, which is advantageous to subsequent interference cancellation based on the radio frequency reference signal.

It should be understood that the foregoing illustrated coupler and power divider that are used as the divider (120) are intended for exemplary description only, but the present invention is not limited thereto. All other apparatuses that can cause a similarity between a waveform of a reference signal and a waveform of a transmit signal to be in a preset range shall fall within the protection scope of the present invention.

It should be noted that in the embodiment of the present invention, power of the two signals that the radio frequency reference signal is divided into may be the same or may be different, which is not particularly limited by the present invention.

In addition, in the embodiment of the present invention, the process of transmitting the transmit signal after baseband processing may be similar to that in the prior art. Herein for avoiding repetition, the description of the process is omitted.

(3) First-Type Interference Canceller (130)

Figure 3:
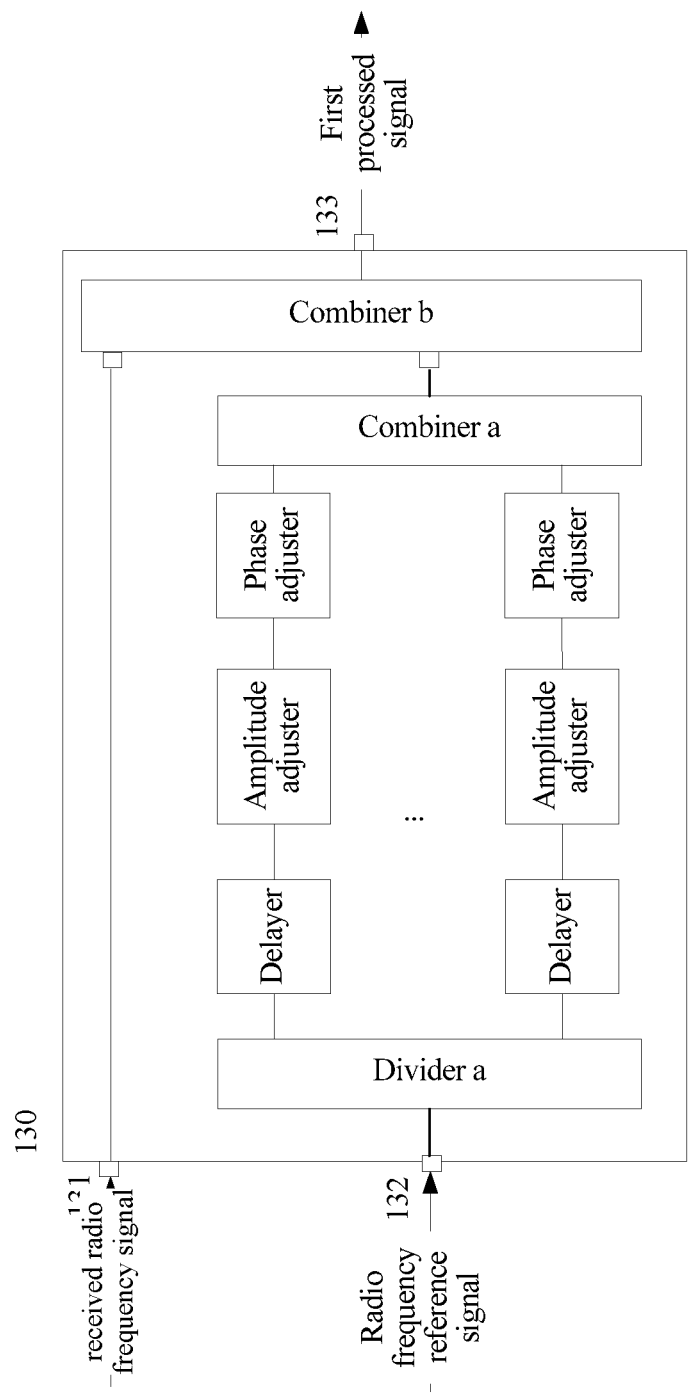
FIG. 3 is a schematic structural diagram of a first-type interference canceller according to an embodiment of the present invention.

Specifically, as shown in FIG. 3, in the embodiment of the present invention, the first-type interference canceller (130) may include a divider a, a combiner a, and a combiner b, where at least one transmission path constituted by at least one of a delayer, a phase adjuster, and an amplitude adjuster connected in series is included between the divider a and the combiner a, where an output end of the combiner a is connected to an input end of the combiner b. In the embodiment of the present invention, the first-type interference canceller (130) has two input ends. The divider a may be a power divider, and the combiner a and the combiner b may be couplers.

The first input end (131) (namely, an input port of the combiner b) of the first-type interference canceller (130) is connected to the output end of the main receive antenna (110), and is configured to receive a signal (namely, a received radio frequency signal) from the output end of the main receive antenna (110); the second input end (132) (namely, an input port of the divider a) of the first-type interference canceller (130) is connected to the first output end (122) of the divider (120), and is configured to receive one radio frequency reference signal from the divider (120).

Optionally, the first-type interference canceller (130) is specifically configured to perform, based on the received radio frequency signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the received radio frequency signal, and that a phase of the radio frequency reference signal is the same or approximately the same as a phase of the first-type self-interference component in the received radio frequency signal; or perform, based on the received radio frequency signal, delay processing, amplitude adjustment processing, and phase adjustment processing on the radio frequency reference signal, so that an amplitude of the radio frequency reference signal is the same or approximately the same as an amplitude of the first-type self-interference component in the received radio frequency signal, and that a difference between a phase of the reference signal and a phase of the first-type self-interference component in the received radio frequency signal is 180 degrees or approximately (180) degrees; and combine radio frequency reference signals after delay processing, amplitude adjustment processing, and phase adjustment processing with the received radio frequency signal.

Specifically, the second input end (132) of the first-type interference canceller (130) is connected to the first output end (122) of the divider (120), and a signal (namely, a radio frequency reference signal) output from the first output end (122) of the divider (120) is input through the second input end (132) of the first-type interference canceller (130) to the divider a, where the divider a may be a power divider. The divider a divides the radio frequency reference signal into several radio frequency reference signals (power of the several radio frequency reference signals may be the same or different). Using one of the several radio frequency reference signals as an example for description, an output end of the divider a outputs one radio frequency reference signal to an adjustment circuit constituted by a delayer, a phase adjuster, and an amplitude adjuster that are connected in series, where the adjustment circuit is configured to adjust a delay, an amplitude, and a phase of a signal by means of delaying, attenuation, phase shifting, and the like. For example, through attenuation, the amplitude of the radio frequency reference signal may approach the amplitude of the first-type self-interference component (including a main-path self-interference signal component) in the received radio frequency signal. Certainly, a best effect is that the amplitudes are the same. However, because an error exists in an actual application, the amplitudes may be adjusted to approximately the same. In addition, through delaying and/or through phase shifting, the difference between the phase of the radio frequency reference signal and the phase of the received radio frequency signal (specifically, the first-type self-interference component in the received radio frequency signal) may be adjusted to (180) degrees or approximately 180 degrees.

Alternatively, through attenuation, the amplitude of the radio frequency reference signal may be in a direction opposite to the amplitude of the first-type self-interference component in the received radio frequency signal. Certainly, a best effect is that directions of the amplitudes are opposite. However, because an error exists in an actual application, the directions of the amplitudes may be adjusted to be approximately opposite. In addition, through delaying and/or through phase shifting, the phase of the radio frequency reference signal may be adjusted to be the same or approximately the same as the phase of the received radio frequency signal (specifically, the first-type self-interference component in the received radio frequency signal).

The divider divides the radio frequency reference signal into multiple signals, and finally the signals are combined by the combiner a, the delay processing, amplitude adjustment processing, and phase adjustment processing may also be functions that occur on each tributary output by the divider, and finally, after combination, objectives of the delay processing, amplitude adjustment processing, and phase adjustment processing of the radio frequency reference signal input at the input end of the divider are achieved, that is, each tributary output by the divider may include at least one of a delayer, a phase adjuster, and an amplitude adjuster.

Certainly, the amplitude adjustment may be expressed as attenuation or gain, and only attenuation is used as an example for description in the foregoing embodiment. In addition, in the embodiment of the present invention, "approximately" may indicate that a similarity between two is within a preset range, where the preset range may be determined at random according to actual use and requirements, and is not particularly limited by the present invention. For avoiding repetition, similar descriptions in the following are omitted unless otherwise specified.

Afterward, radio frequency reference signals of all tributaries output by the divider a are combined by the combiner a after the amplitude and phase adjustment, and then input to another input port of the combiner b. Therefore, the combiner b may combine the received radio frequency signal with the radio frequency reference signal obtained after the amplitude and phase adjustment and combination (for example, add the radio frequency reference signal to the radio frequency receive signal or subtract the radio frequency reference signal from the radio frequency receive signal), to cancel the first-type self-interference component in the received radio frequency signal, thereby implementing first-type self-interference component cancellation processing for the received radio frequency signal.

For illustration instead of limitation, in the embodiment of the present invention, the amplitude adjuster may be, for example, an attenuator. The phase adjuster may be, for example, a phase shifter. The delayer may be, for example, a delay line.

Therefore, the first processed signal output from the output end (133) (specifically, the output end of the combiner b) of the first-type interference canceller (130) is a signal generated by canceling the first-type self-interference component in the received radio frequency signal.

It should be noted that in the embodiment of the present invention, the delayer, phase adjuster, and amplitude adjuster may be adjusted in a manner of minimizing strength of the first processed signal output by the combiner b, based on the output of the combiner b. In addition, the present invention is not limited to the foregoing implementation manner. As long as strength of the received radio frequency signal can be reduced according to the radio frequency reference signal (or strength of the first processed signal is less than strength of the received radio frequency signal), an interference cancellation effect can be achieved.

(4) Down Converter (140)

Specifically, the down converter (140) may be a mixer.

The down converter (140) receives, through the first input end (141), the first processed signal output by the output end (133) of the first-type interference canceller (130). The down converter (140) receives, through the second input end (142), the first local-frequency signal output by the first output end (192) of the local-frequency signal generator (190), and performs frequency mixing processing on the first local-frequency signal and the first processed signal to acquire a second processed signal, where the first local-frequency signal is a signal having a preset frequency difference $f_{IF}$ from a radio frequency carrier of a transmit signal of a peer end, so that the generated second processed signal is a low or intermediate frequency signal centered on $f_{IF}$.

(5) Filter (150)

Specifically, the filter (150) may be exemplarily a low-pass filter of a band-pass type or a band-stop type.

The input end (151) of the filter (150) receives the second processed signal output by the output end (143) of the down converter (140). The filter (150) performs filtering processing on the second processed signal to generate a third processed signal after filtering a high frequency component in the second processed signal, and outputs the third processed signal to the first input end (161) of the coupler (160) through the output end (152) of the filter (150).

(6) Coupler (160)

Specifically, the coupler (160) is configured to receive, through the first input end (161), the third processed signal output by the output end (152) of the filter (150). The coupler (160) is further configured to receive, through the second input end (162), the reconstructed self-interference signal transmitted by the first output end (185) of the second-type interference reconstructor (180), cancel a second-type self-interference signal in the first processed signal according to the reconstructed self-interference signal to generate a fourth processed signal, and output the fourth processed signal to the input end (171) of the digital down-conversion unit (170) through the output end (163) of the coupler (160).

(7) Digital Down-Conversion Unit (170)

The digital down-conversion unit (170) is configured to receive, through the input end (171), the fourth processed signal output by the output end (163) of the coupler (160), convert the fourth processed signal into a digital signal, and perform digital down-conversion processing on the digital signal to acquire a fifth processed signal, and output the fifth processed signal to the input end (201) of the divider (200) through the output end (172) of the digital down-conversion unit (170).

Specifically, referring to FIG. 2, exemplarily, the digital down-conversion unit (170) includes an ADC (1701) and a digital down converter (1702). The ADC (1701) is specifically configured to convert the fourth processed signal into the digital signal; and the digital down converter (1702) is configured to perform digital down-conversion processing on the digital signal to acquire the fifth processed signal.

(8) Second-Type Interference Reconstructor (180)

Figure 4:
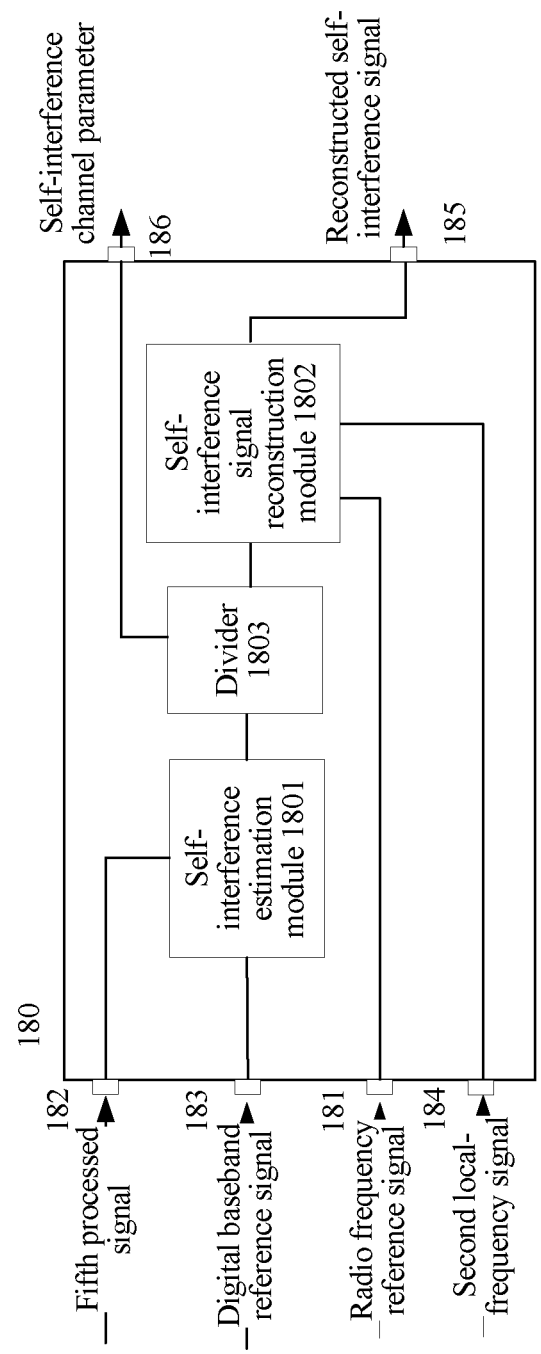
FIG. 4 is a schematic structural diagram of a second-type interference reconstructor according to an embodiment of the present invention.

Specifically, as shown in FIG. 4, in the embodiment of the present invention, the second-type interference reconstructor (180) may include a self-interference estimation module (1801) and a self-interference signal reconstruction module (1802).

The self-interference estimation module (1801) is configured to acquire the digital baseband reference signal, receive the fifth processed signal transmitted by the digital down-conversion unit (170), and perform self-interference channel estimation according to the digital baseband reference signal and the fifth processed signal to acquire the self-interference channel parameter.

Optionally, to perform self-interference channel estimation according to the digital baseband reference signal and the fifth processed signal, a pilot-based channel estimation method or an adaptive filtering method such as an LMS (Least mean squares, least mean squares) algorithm or an RLS (Recursive least mean squares, recursive least mean squares) algorithm may be used, which pertains to the prior art and is not further described. Optionally, the self-interference estimation module (1801) includes any one of a field-programmable gate array FPGA (Field-Programmable Gate Array), a central processing unit CPU (Central Processing Unit), or another application-specific integrated circuit ASIC (Application Specific Integrated Circuit).

In addition, optionally, the transmit signal includes a self-interference channel estimation timeslot and a data transmission timeslot that are disposed at an interval. In the data transmission timeslot, full duplex data communication may be performed. In the self-interference channel estimation timeslot, a communications peer does not transmit data, and a signal received by a local receiver includes only a self-interference signal. Because there is no signal from the communications peer, the local receive end uses the self-interference channel estimation timeslot to perform self-interference channel estimation to acquire a self-interference channel parameter. Specifically, in the self-interference channel estimation timeslot, the received radio frequency signal includes only a second-type self-interference component. In the self-interference channel estimation timeslot, self-interference channel estimation is performed according the digital baseband reference signal and the digital signal that is acquired by processing the received radio frequency signal. Therefore, in the self-interference channel estimation timeslot, the communications peer does not transmit a signal, and a signal received by the receiver includes only a self-interference signal. Because there is no signal from the communications peer, the receiver may perform self-interference channel estimation in the self-interference channel estimation timeslot to acquire a self-interference channel parameter, where the self-interference channel parameter may include parameters indicating a transmission path delay, a phase, and an amplitude of a second-type self-interference component. In the data transmission timeslot, a signal received by the receiver includes a self-interference signal and a data signal, and the receiver may reconstruct a self-interference signal in the data transmission timeslot according to the radio frequency reference signal and the self-interference channel parameter, and use the reconstructed self-interference signal to cancel the second-type self-interference component.

The self-interference signal reconstruction module (1802) is configured to acquire the second local-frequency signal generated by the local-frequency signal generator (190), receive the radio frequency reference signal acquired by the divider (120) and the self-interference channel parameter acquired by the self-interference estimation module (1801), and reconstruct the self-interference signal according to the self-interference channel parameter, the radio frequency reference signal, and the second local-frequency signal.

FIG. 4 further shows a divider (1803), where an input end of the divider (1803) is configured to receive the self-interference channel parameter transmitted by the second-type interference reconstructor (180). The divider (1803) divides the self-interference channel parameter into two. One is output to the self-interference signal reconstruction module (1802) through a first output end of the divider (1803), and the other is output to the local-frequency signal generator (190) through the second output end (186) of the second-type interference reconstructor (180) that is connected to a second output end of the divider (1803).

Figure 5:
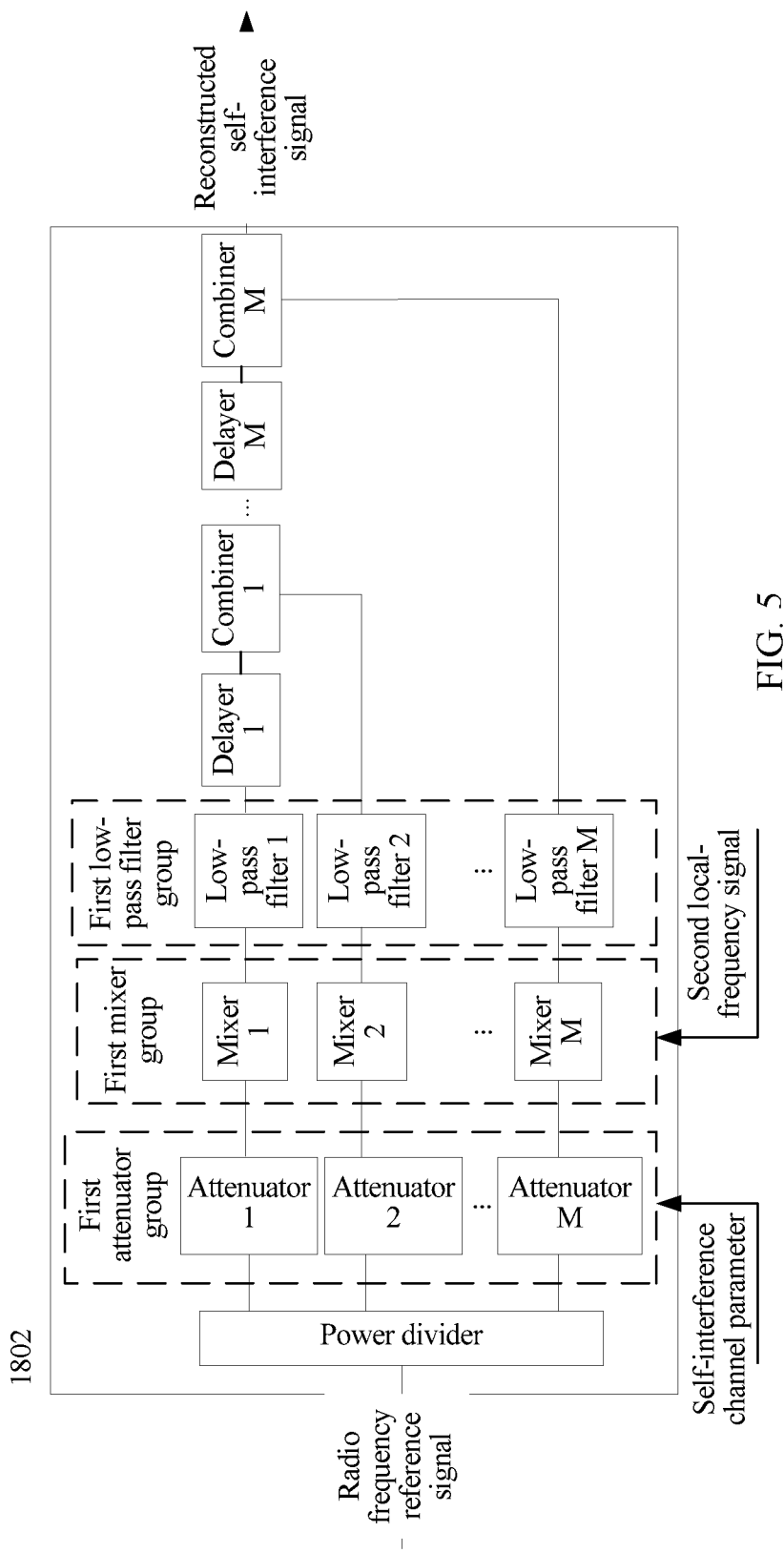
FIG. 5 is a schematic structural diagram of a self-interference signal reconstruction module according to an embodiment of the present invention.

Further, referring to FIG. 5, the self-interference signal reconstruction module (1802) includes:
a first power divider, a first attenuator group, a first mixer group, a first low-pass filter group, and a first delayer group, where:
the first power divider is configured to receive the radio frequency reference signal, and divide the radio frequency reference signal into at least one signal;
the first attenuator group includes at least one attenuator, where the attenuator is configured to perform attenuation processing on one of the radio frequency reference signal according to the self-interference channel parameter;
the first mixer group includes at least one mixer, where the mixer is configured to perform, according to the second local-frequency signal, frequency mixing processing on one of the radio frequency reference signal after attenuation processing;
the first low-pass filter group includes at least one low-pass filter, where the low-pass filter is configured to perform filtering processing on one of the radio frequency reference signal after frequency mixing processing; and
the first delayer group includes at least one delayer and at least one combiner, where:
the at least one delayer is connected in series by using a first input end and an output end of a combiner, an input end of a first delayer and a second input end of the combiner are configured to input one radio frequency reference signal after filtering processing, and an input end of a last combiner is configured to output the reconstructed self-interference signal.

In addition, with reference to FIG. 5 and in combination with the foregoing description, it may be understood that the first delayer group may include M delayers and M combiners, which are configured to perform delaying on the radio frequency reference signal for at most M times and form delay signals of M radio frequency reference signals. Therefore, a quantity of delay taps that may be formed by the M delayers included in the first delayer group is M. Exemplarily, the filtering processing by the low-pass filter is removing a high frequency signal in each radio frequency reference signal.

Figure 6:
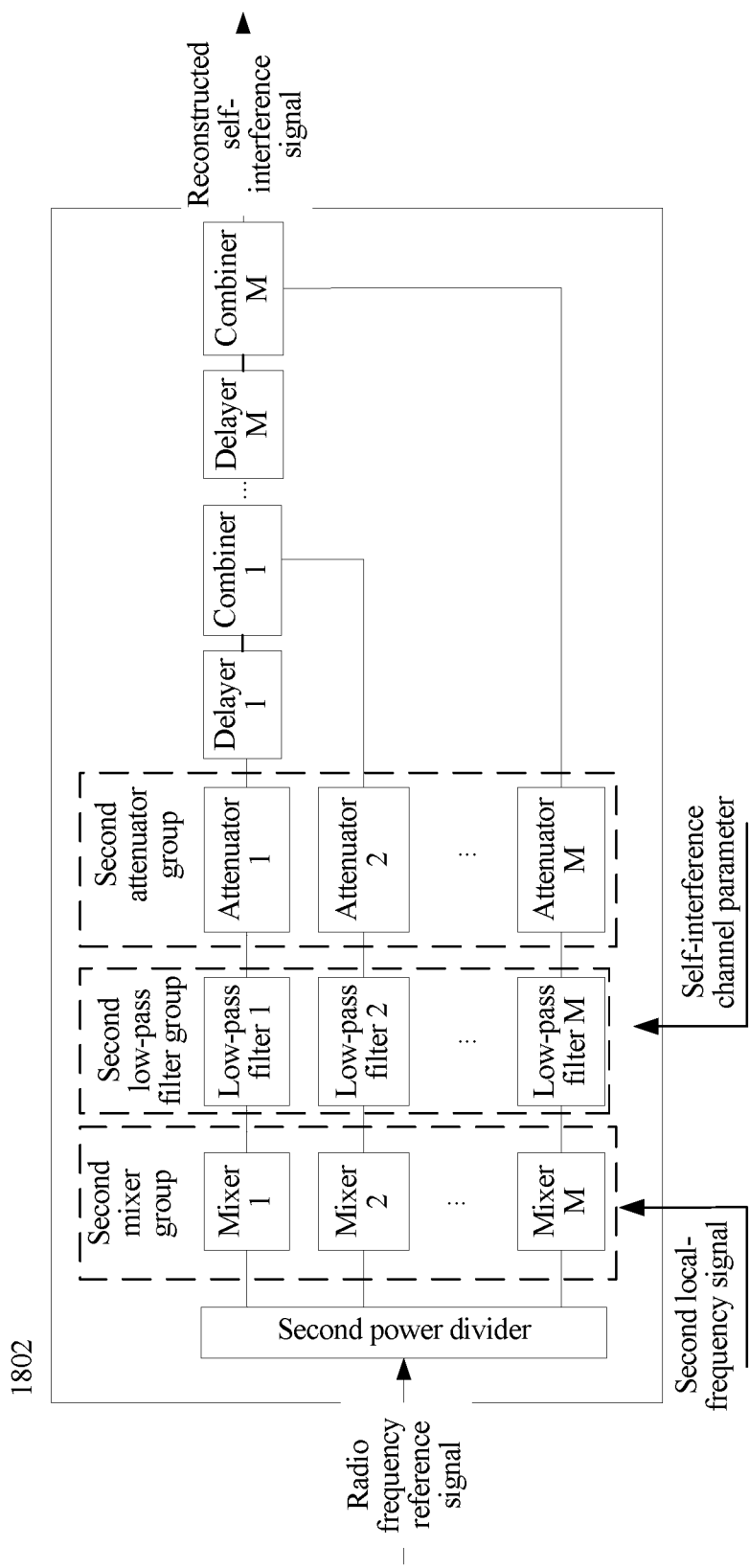
FIG. 6 is a schematic structural diagram of a self-interference signal reconstruction module according to another embodiment of the present invention.

Optionally, referring to FIG. 6,
the self-interference signal reconstruction module (1802) includes:
a second power divider, a second mixer group, a second low-pass filter group, a second attenuator group, and a second delayer group, where:
the second power divider is configured to receive the radio frequency reference signal, and divide the radio frequency reference signal into at least one signal;
the second mixer group includes at least one mixer, where the mixer is configured to perform frequency mixing processing on one of the radio frequency reference signal according to the second local-frequency signal;
the second low-pass filter group includes at least one low-pass filter, where the low-pass filter is configured to perform filtering processing on one of the radio frequency reference signal after frequency mixing processing;
the second attenuator group includes at least one attenuator, where the attenuator is configured to perform, according to the self-interference channel parameter, attenuation processing on one of the radio frequency reference signal after filtering processing; and
the second delayer group includes at least one delayer and at least one combiner, where:
the at least one delayer is connected in series by using a first input end and an output end of a combiner, an input end of a first delayer and a second input end of the combiner are configured to input one radio frequency reference signal after attenuation processing, and an input end of a last combiner is configured to output the reconstructed self-interference signal.

Likewise, with reference to FIG. 6 and in combination with the foregoing description, it may be understood that the second delayer group may include M delayers and M combiners, which are configured to perform delaying on the radio frequency reference signal for at most M times and form delay signals of M radio frequency reference signals. Therefore, a quantity of delay taps that may be formed by the M delayers included in the second delayer group is M. Exemplarily, the filtering processing by the low-pass filter is removing a high frequency signal in each radio frequency reference signal.

In the embodiments corresponding to FIG. 5 and FIG. 6, if a smallest multi-path delay difference that is of a self-interference channel and that can be resolved by the self-interference signal reconstruction module (1802) is T, a delay generated by each delay tap may be set to T, that is, each delayer may form a delay T for one radio frequency reference signal. The smallest multi-path delay difference is determined according to a bandwidth W of a baseband transmit signal of a peer end, that is, $T=1/\alpha \cdot 1/W$, where $\alpha \geq 1$, and when $\alpha > 1$, a super-resolution algorithm needs to be used for implementation. For example, a transmit signal bandwidth is W=40 MHz, and T=1/W=25 ns may be used. If the quantity of delay taps is M=16, a reconstructed self-interference signal with a delay of MT=400 ns may be reconstructed at most. This is equivalent to a signal reflected by a reflector that is 60 meters away from an emitter.

(9) Local-Frequency Signal Generator (190)

Specifically, the input end (191) of the local-frequency signal generator (190) is configured to receive the self-interference channel parameter through the second output end (186) of the second-type interference reconstructor (180), and generate the first local-frequency signal and the second local-frequency signal according to the self-interference channel parameter. The local-frequency signal generator (190) is further configured to transmit the first local-frequency signal to the second input end of the down converter (140) through the first output end (192), and transmit the second local-frequency signal to the fourth input end (184) of the second-type interference reconstructor (180) through the second output end (193).

Figure 7:
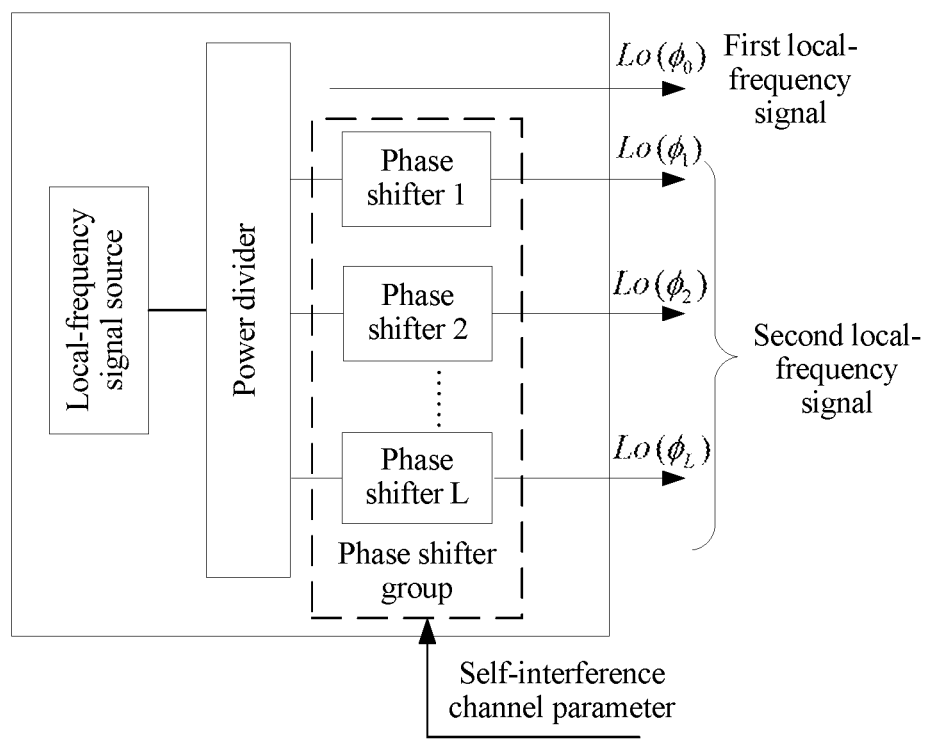
FIG. 7 is a schematic structural diagram of a local-frequency signal generator according to an embodiment of the present invention.

Referring to FIG. 7, the local-frequency signal generator (190) includes:

a local-frequency signal source, a third power divider, and a phase shifter group, where:

the third power divider is configured to divide a local-frequency signal transmitted by the local-frequency signal source into at least one local-frequency signal, where one local-frequency signal is used as the first local-frequency signal, and the other local-frequency signals are input to the phase shifter group; and the phase shifter group includes at least one phase shifter, where the phase shifter is configured to perform phase shift processing on one local-frequency signal according to the self-interference channel parameter, and the phase shifter group uses each local-frequency signal obtained after phase shift processing as the second local-frequency signal.

With reference to FIG. 7, a local-frequency signal transmitted by the local-frequency signal source is $Lo(\varphi_0)$, and the first local-frequency signal is $Lo(\varphi_0)$, which means that no phase shift processing is performed on the local-frequency signal. The second local-frequency signal includes L local-frequency signals $Lo(\phi_1)$ to $Lo(\phi_L)$ after phase shift processing is performed on the local-frequency signal. According to the description in the embodiments corresponding to FIG. 5 and FIG. 6, the second local-frequency signal is used by each mixer in the self-interference signal reconstruction module (1802) for performing frequency mixing on each radio frequency reference signal. In this case, each local-frequency signal, obtained after phase shift processing, in the second local-frequency signal is used as a local-frequency signal provided to a mixer.

(10) Divider (200)

FIG. 2 further shows the divider (200). Its structure and operating principle are the same as those of the divider (120). The divider (200) is configured to divide the fifth processed signal. Specifically, the input end (201) of the divider (200) is connected to the output end (172) of the digital down-conversion unit (170); the first output end (202) of the divider (200) outputs the fifth processed signal; and the third output end (203) of the divider (200) is connected to the second input end (182) of the second-type interference reconstructor (180), and outputs the fifth processed signal to the second-type interference reconstructor (180).

Figure 8:
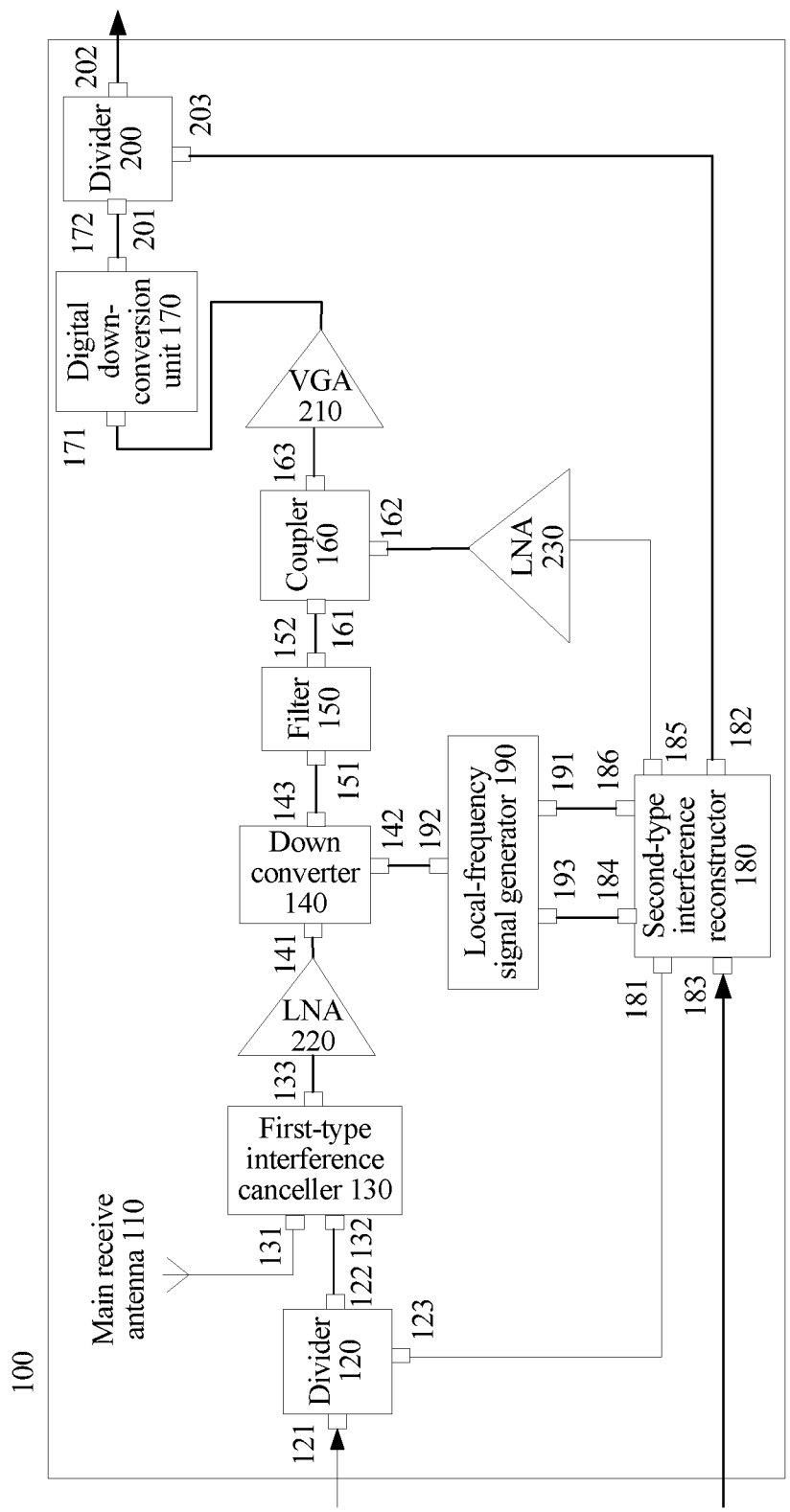
FIG. 8 is a schematic structural diagram of an interference cancellation apparatus according to another embodiment of the present invention.

Referring to FIG. 8, the interference cancellation apparatus further includes a first amplifier (210), where the first amplifier (210) is disposed between the coupler (160) and the digital down-conversion unit (170). In FIG. 8, a variable gain amplifier (Variable Gain Amplifier, VGA) is used as an example of the first amplifier, and the first amplifier (210) is configured to amplify the fourth processed signal. The first amplifier (210) amplifies the fourth processed signal, which may reduce a requirement of a transmitter side on power of a radio frequency transmit signal.

Further, referring to FIG. 8, the interference cancellation apparatus includes:

a second amplifier (220), disposed between the first-type interference canceller (130) and the down converter (140), and configured to amplify the first processed signal; and a third amplifier (230), disposed between the coupler (160) and the second-type interference reconstructor (180), and configured to amplify the reconstructed self-interference signal.

In FIG. 8, for example, both the second amplifier and the third amplifier are LNAs. The second amplifier amplifies the first processed signal before noise reduction processing, and the third amplifier amplifies the reconstructed self-interference signal. In this way, a requirement on power of the radio frequency reference signal may be reduced, and the requirement of the transmitter side on the power of the radio frequency transmit signal is further reduced.

Figure 9:
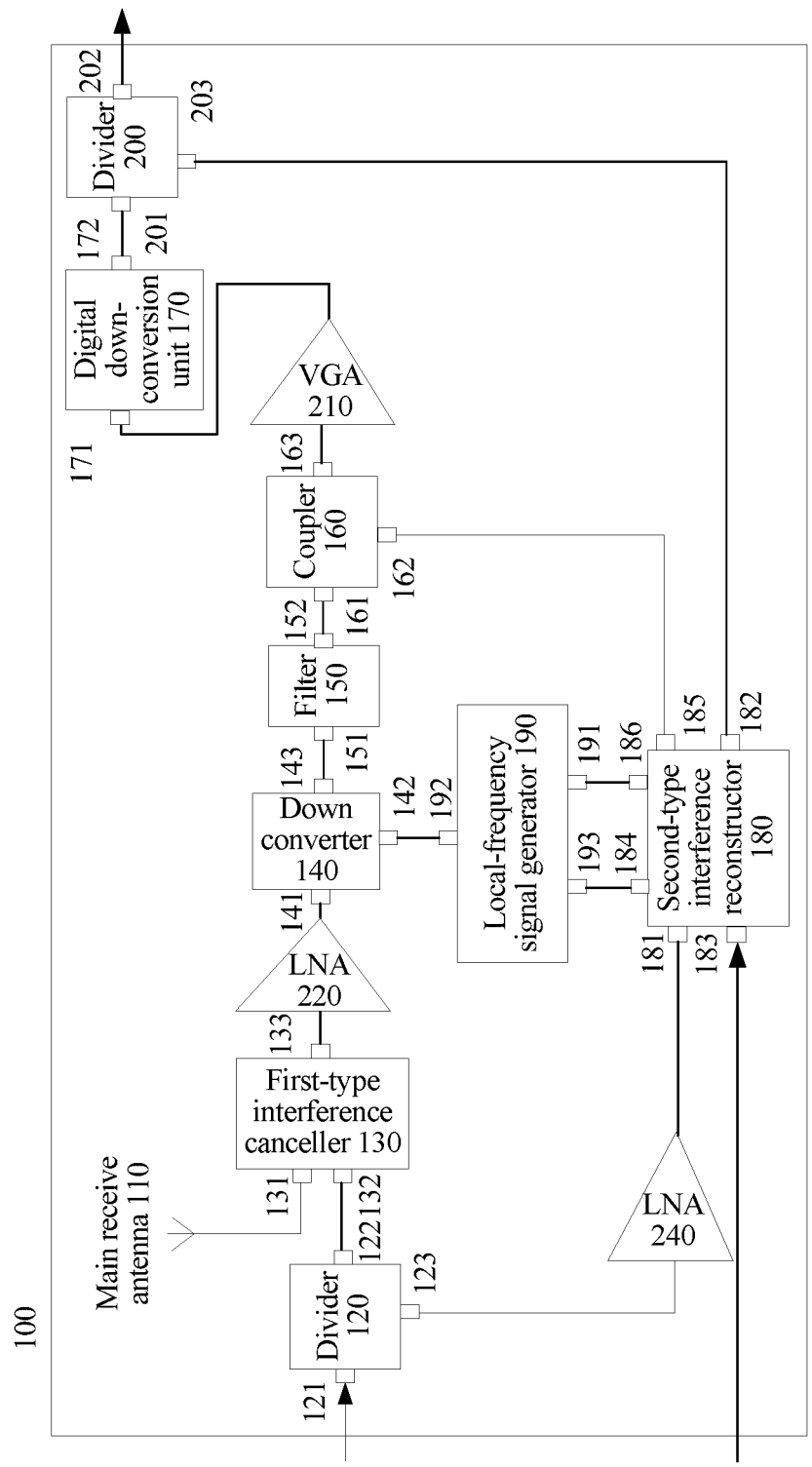
FIG. 9 is a schematic structural diagram of an interference cancellation apparatus according to still another embodiment of the present invention.

Further, referring to FIG. 9, the interference cancellation apparatus further includes:

a second amplifier (220), disposed between the first-type interference canceller (130) and the down converter (140), and configured to amplify the first processed signal; and a fourth amplifier (240), disposed between the divider (120) and the second-type interference reconstructor (180), and configured to amplify the radio frequency reference signal received by the second-type interference reconstructor.

In FIG. 9, for example, both the second amplifier and the fourth amplifier are LNAs. The second amplifier amplifies the first processed signal before noise reduction processing, and the fourth amplifier amplifies the radio frequency reference signal that enters the second-type interference reconstructor (180). In this way, the requirement on the power of the radio frequency reference signal may be reduced, and the requirement of the transmitter side on the power of the radio frequency transmit signal is further reduced.

The following further describes the principle of the present invention. A transmit signal is a quadrature modulated signal, and may be expressed as:

$$s(t)=s_i(t)\cos \omega t+s_q(t)\sin \omega t \qquad \text{formula (1)}$$

where, $\omega$ is an angular frequency of a radio frequency carrier, and $s_i(t)$ and $s_q(t)$ are baseband I/Q signals of a transmit end; with an adverse impact of noise ignored, a received radio frequency signal that has passed through a radio channel may be expressed as:

$$y(t) = s(t) \otimes h(t) \quad \text{formula (2)}$$

$$\text{where, } h(t) = \sum_k h_k \delta(t - \tau_k)$$

is a channel response, $h_k$ is a multi-path channel coefficient corresponding to a delay $\tau_k$, and formula (2) is further expressed as:

$$y(t) = \quad \text{formula (3)}$$

$$\sum_k h_k s_i(t - \tau_k)\cos(\omega t - \omega \tau_k) + \sum_k h_k s_q(t - \tau_k)\sin(\omega t - \omega \tau_k)$$

The received radio frequency signal y(t) is down-converted to a low or intermediate frequency $\omega_0=\omega-\omega_L$ by a down converter (a mixer (130)). After a high frequency component is filtered out by a filter (140) (herein, a Low-Pass Filter, LPF low-pass filter, is used), an obtained signal may be expressed as:

$$z(t) = LPF\langle y(t) \cdot \cos(\omega_L t + \varphi_0)\rangle = \quad \text{formula (4)}$$

$$= \sum_k h_k [s_i(t - \tau_k)\cos(\omega_0 t - \omega \tau_k - \varphi_0) +$$

$$s_q(t - \tau_k)\sin(\omega_0 t - \omega \tau_k - \varphi_0)]$$

where, $\varphi_0$ is an initial phase of a local-frequency signal relative to the radio frequency carrier.

If s(t) is used as a radio frequency reference signal, after a local-frequency signal of a same source is phase-shifted by $\omega_L \tau_k$, the radio frequency reference signal is down-converted to a low or intermediate frequency $\omega_0=\omega-\omega_L$ by a down converter (a mixer (130)) by using the phase-shifted local-frequency signal. After a high frequency component is filtered out by a filter (140) (herein, a Low Pass Filter, LPF low-pass filter, is used), an obtained signal is:

$$y_k(t) = LPF\langle s(t) \cdot \cos(\omega_L t + \varphi_0 + \omega_L \tau_k)\rangle \quad \text{formula (5)}$$

$$= s_i(t)\cos(\omega_0 t - \varphi_0 - \omega_L \tau_k) + s_q(t)\sin(\omega_0 t - \varphi_0 - \omega_L \tau_k)$$

After the signal shown in formula (5) is delayed by $\tau_k$, the following is obtained:

$$y_k(t-\tau_k)=s_i(t-\tau_k)\cos[\omega_0 t-\varphi_0-(\omega_0+\omega_L)\tau_k]+s_q(t-\tau_k)\sin[\omega_0 t-\varphi_0-(\omega_0+\omega_L)\tau_k]$$

Because $\omega_0+\omega_L=\omega$, the following is obtained:

$$y_k(t-\tau_k)=s_i(t-\tau_k)\cos(\omega_0 t-\omega\tau_k-\varphi_0)+s_q(t-\tau_k)\sin(\omega_0 t-\omega\tau_k-\varphi_0) \quad \text{formula (6)}$$

After formula (6) is substituted into formula (4), the following is obtained:

$$y(t) = \sum_k h_k y_k(t - \tau_k) \quad \text{formula (7)}$$

If h(t) is a response of a self-interference channel, formulas (5) and (7) indicate that a radio frequency transmit signal s(t) may be used as a radio frequency reference signal. In the following manner, the second-type interference reconstructor (180) reconstructs the low or intermediate frequency self-interference signal shown in formula (4): First, the input radio frequency reference signal is divided into multiple signals by a power divider. After a local-frequency signal of a same source is phase-shifted by $\omega_L \tau_k$, each signal is down-converted to a low or intermediate frequency $\omega_0$ by using the phase-shifted local-frequency signal, and then delayed by $\tau_k$, and a reconstructed low or intermediate self-interference signal component of a corresponding path is obtained. Amplitudes $h_k$ of these components may be set by using an attenuator. Only a brief description is provided herein. For the specific process, reference may be made to the function description of the second-type interference reconstructor (180).

It should be noted that when a full duplex transceiver performs reception and transmission by using multiple antennas (Multiple Input Multiple Output, MIMO), a receive tributary corresponding to each receive antenna requires a near-field jammer corresponding to each transmit antenna, for reconstructing a self-interference signal corresponding to each transmit tributary and canceling first-type self-interference components one by one.

According to the interference cancellation apparatus provided in the embodiment of the present invention, for a received radio frequency signal acquired by a main receive antenna, interference cancellation processing is performed according to a radio frequency reference signal to cancel a first-type self-interference component in the received radio frequency signal and acquire a first processed signal; and further, after down-conversion processing is performed on the first processed signal, a self-interference signal is reconstructed through self-interference channel estimation to cancel a second-type self-interference component in the first processed signal. Because the reconstructed self-interference signal is used directly in an analog domain to cancel the second-type self-interference component, a limitation by a dynamic range of an ADC/DAC can be avoided, and the second-type self-interference component can be canceled effectively. Further, because the received radio frequency signal is converted to a low or intermediate frequency for processing, the second-type self-interference component can be traced and canceled more effectively.

The interference cancellation apparatus according to the embodiment of the present invention is described in detail above with reference to FIG. 1 to FIG. 9. The following describes in detail an interference cancellation method according to an embodiment of the present invention with reference to FIG. 10.

Figure 10:
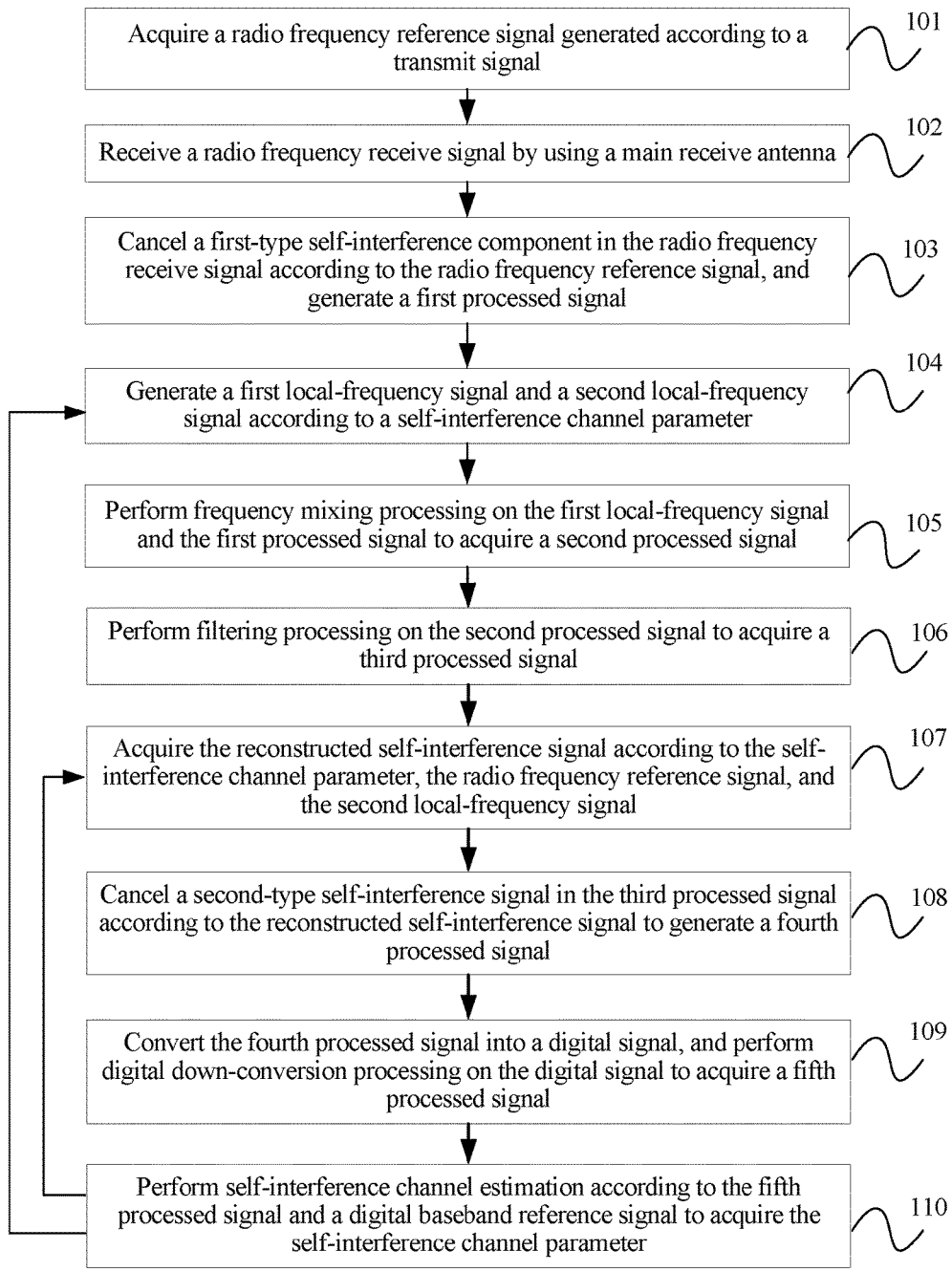
FIG. 10 is a schematic flowchart of an interference cancellation method according to an embodiment of the present invention.

FIG. 10 shows a schematic flowchart of an interference cancellation method, where the method includes the following steps:

101. Acquire a radio frequency reference signal generated according to a transmit signal.

102. Receive a radio frequency signal by using a main receive antenna.

103. Cancel a first-type self-interference component in the received radio frequency signal according to the radio frequency reference signal, to generate a first processed signal, where the first-type self-interference component includes a main-path self-interference component.

104. Generate a first local-frequency signal and a second local-frequency signal according to a self-interference channel parameter.

105. Perform frequency mixing processing on the first local-frequency signal and the first processed signal to acquire a second processed signal.

106. Perform filtering processing on the second processed signal to acquire a third processed signal.

107. Reconstruct the self-interference signal according to the self-interference channel parameter, the radio frequency reference signal, and the second local-frequency signal.

108. Cancel a second-type self-interference signal in the third processed signal according to the reconstructed self-interference signal to generate a fourth processed signal.

109. Convert the fourth processed signal into a digital signal, and perform digital down-conversion processing on the digital signal to acquire a fifth processed signal.

110. Perform self-interference channel estimation according to the fifth processed signal and a digital baseband reference signal to acquire the self-interference channel parameter.

Specifically, in step 101, a transmit signal obtained after baseband processing (for example, processing such as digital-to-analog conversion, up conversion, and power amplification) may be used as a radio frequency reference signal, and input to, for example, a coupler or a power divider. Therefore, the radio frequency reference signal can be divided into two signals by the coupler or power divider, where one signal is used to generate a first processed signal and the other signal is used to reconstruct a self-interference signal.

Optionally, in step 110, specifically, digital sampling may be performed on the radio frequency reference signal to acquire the digital baseband reference signal.

In addition, the coupler or power divider is used to divide the radio frequency reference signal into two signals in such a manner that waveforms of the two signals can be consistent with that of the transmit signal, which is advantageous to subsequent interference cancellation (including cancellation of the first-type self-interference component and cancellation of the second-type self-interference component) based on the radio frequency reference signal, where waveform consistency includes that the waveforms are the same as the waveform of the transmit signal or that a waveform similarity is within a preset range.

Optionally, after step 108, the method further includes: amplifying the fourth processed signal. Herein a variable gain amplifier (VGA) may be selected for amplifying the fourth processed signal. The amplifying the fourth processed signal may reduce a requirement of a transmitter side on power of a radio frequency transmit signal.

Alternatively, optionally, after step 103, the method further includes: amplifying the first processed signal; and after step 107, the method further includes: amplifying the reconstructed self-interference signal. Amplification of various signals is amplification performed by using a low noise amplifier (LNA). Separately amplifying the first processed signal and amplifying the reconstructed self-interference signal may reduce a requirement on power of the radio frequency reference signal, and further reduce the requirement of the transmitter side on the power of the radio frequency transmit signal.

Alternatively, optionally, after step 103, the method further includes: amplifying the first processed signal; and before the acquiring the reconstructed self-interference signal according to the self-interference channel parameter, the radio frequency reference signal, and the second local-frequency signal in step 107, the method further includes: amplifying the radio frequency reference signal. Amplification of various signals is amplification performed by using a low noise amplifier (LNA). Separately amplifying the first processed signal and amplifying the radio frequency reference signal input into the second-type interference reconstructor may reduce the requirement on the power of the radio frequency reference signal, and further reduce the requirement of the transmitter side on the power of the radio frequency transmit signal.

Optionally, the canceling a first-type self-interference component in the received radio frequency signal according to the radio frequency reference signal, to generate a first processed signal in step 103 includes:

performing, based on the received radio frequency signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the received radio frequency signal, and that a phase of the radio frequency reference signal is the same or approximately the same as a phase of the first-type self-interference component in the received radio frequency signal; or performing, based on the received radio frequency signal, delay processing, amplitude adjustment processing, and phase adjustment processing on the radio frequency reference signal, so that an amplitude of the radio frequency reference signal is the same or approximately the same as an amplitude of the first-type self-interference component in the received radio frequency signal, and that a difference between a phase of the reference signal and a phase of the first-type self-interference component in the received radio frequency signal is 180 degrees or approximately 180 degrees.

In the embodiment of the present invention, for example, an adjustment circuit constituted by a delayer, a phase adjuster, and an amplitude adjuster that are connected in series may be used for implementation. Therefore, in step 103, the amplitude and phase of the radio frequency reference signal may be adjusted by the adjustment circuit through delaying, phase shifting, attenuation, and the like. For example, through attenuation, the amplitude of the radio frequency reference signal may approach the amplitude of the first-type self-interference component in the received radio frequency signal. Certainly, a best effect is that the amplitudes are the same. However, because an error exists in an actual application, the amplitudes may be adjusted to approximately the same. In addition, through phase shifting and/or delaying, the phase of the radio frequency reference signal may be adjusted to be opposite or approximately opposite to the phase of the first-type self-interference component (including a main-path interference signal) in the received radio frequency signal.

Afterward, radio frequency reference signals obtained after delaying, and amplitude and phase adjustment may be combined with (for example, added to) the received radio frequency signal, to cancel the first-type self-interference component in the received radio frequency signal. In this way, first-type self-interference component cancellation processing is implemented for the received radio frequency signal, and the signal obtained after the processing is used as the first processed signal.

For illustration instead of limitation, in the embodiment of the present invention, the amplitude adjuster may be, for example, an attenuator. The phase adjuster may be, for example, a phase shifter, and the delayer may be a delay line.

It should be understood that the foregoing illustrated method and process for canceling the first-type self-interference component in the received radio frequency signal based on the radio frequency reference signal are intended for exemplary description only, but the present invention is not limited thereto. For example, the delayer, phase shifter, and attenuator may also be adjusted in a manner of minimizing strength of the first processed signal.

Optionally, the acquiring the reconstructed self-interference signal according to the self-interference channel parameter, the radio frequency reference signal, and the second local-frequency signal in step 107 includes:

dividing the radio frequency reference signal into at least one signal;

performing attenuation processing on each of the radio frequency reference signal according to the self-interference channel parameter;

performing, according to the second local-frequency signal, frequency mixing processing on each of the radio frequency reference signal after attenuation processing;

performing filtering processing on each of the radio frequency reference signal after frequency mixing processing; and performing delay processing on each of the radio frequency reference signal after filtering processing, and combing the radio frequency reference signal to reconstruct the self-interference signal.

Alternatively, optionally, the acquiring the reconstructed self-interference signal according to the self-interference channel parameter, the radio frequency reference signal, and the second local-frequency signal in step 107 includes:

dividing the radio frequency reference signal into at least one signal;

performing frequency mixing processing on each of the radio frequency reference signal according to the second local-frequency signal;

performing filtering processing on each of the radio frequency reference signal after frequency mixing processing;

performing, according to the self-interference channel parameter, attenuation processing on each of the radio frequency reference signal after filtering processing; and performing delay processing on each of the radio frequency reference signal after attenuation processing, and combing the radio frequency reference signal to reconstruct the self-interference signal.

Further, the generating the first local-frequency signal and the second local-frequency signal according to a self-interference channel parameter in step 104 includes:

dividing a local-frequency signal into at least one local-frequency signal, where one local-frequency signal is used as the first local-frequency signal; and performing phase shift processing on each local-frequency signal except the first local-frequency signal according to the self-interference channel parameter to generate the second local-frequency signal.

According to the description of the foregoing embodiment, further, the transmit signal includes a self-interference channel estimation timeslot and a data transmission timeslot that are disposed at an interval. In the self-interference channel estimation timeslot, a communications peer does not transmit a signal, and a signal received by a receiver includes only a self-interference signal. Because there is no signal from the communications peer, the receiver may perform self-interference channel estimation in the self-interference channel estimation timeslot to acquire a self-interference channel parameter, where the self-interference channel parameter may include parameters indicating a transmission path delay, a phase, and an amplitude of a second-type self-interference component. In the data transmission timeslot, a signal received by the receiver includes a self-interference signal and a data signal, and the receiver may generate a reconstructed self-interference signal in the data transmission timeslot according to the radio frequency reference signal and the self-interference channel parameter, and use the reconstructed self-interference signal to cancel the second-type self-interference component. A specific embodiment is not further described herein. For details, reference may be made to the description in the apparatus embodiment.

According to the interference cancellation method provided in the embodiment of the present invention, for a received radio frequency signal acquired by a main receive antenna, interference cancellation processing is performed according to a radio frequency reference signal to cancel a first-type self-interference component in the received radio frequency signal and acquire a first processed signal; and further, after down-conversion processing is performed on the first processed signal, a self-interference signal is reconstructed through self-interference channel estimation to cancel a second-type self-interference component in the first processed signal. Because the reconstructed self-interference signal is used directly in an analog domain to cancel the second-type self-interference component, a limitation by a dynamic range of an ADC/DAC can be avoided, and the second-type self-interference component can be canceled effectively. Further, because the received radio frequency signal is converted to a low or intermediate frequency for processing, the second-type self-interference component can be traced and canceled more effectively.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or parts may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interference cancellation apparatus, comprising:
a main receive antenna, configured to receive a radio frequency signal, and transmit the received radio frequency signal to a first-type interference canceller;
a divider, configured to acquire a radio frequency reference signal generated according to a transmit signal, and transmit the radio frequency reference signal to the first-type interference canceller and a second-type interference reconstructor;
the first-type interference canceller, configured to receive the radio frequency reference signal transmitted by the divider and the received radio frequency signal transmitted by the main receive antenna, and cancel a first-type self-interference component in the received radio frequency signal according to the radio frequency reference signal to acquire a first processed signal, wherein the first-type self-interference component comprises a main-path self-interference component;
a local-frequency signal generator, configured to acquire a self-interference channel parameter acquired by the second-type interference reconstructor, and generate a first local-frequency signal and a second local-frequency signal according to the self-interference channel parameter;
a down converter, configured to receive the first local-frequency signal generated by the local-frequency signal generator and the first processed signal acquired by the first-type interference canceller, and perform frequency mixing processing on the first local-frequency signal and the first processed signal to acquire a second processed signal;
a filter, configured to receive the second processed signal, and perform filtering processing on the second processed signal to acquire a third processed signal;
the second-type interference reconstructor, configured to acquire the second local-frequency signal generated by the local-frequency signal generator and the radio frequency reference signal acquired by the divider, and reconstruct the self-interference signal according to the self-interference channel parameter, the radio frequency reference signal, and the second local-frequency signal;
a coupler, configured to receive the third processed signal acquired by the filter and the reconstructed self-interference signal transmitted by the second-type interference reconstructor, and cancel a second-type self-interference signal in the third processed signal according to the reconstructed self-interference signal to generate a fourth processed signal; and
a digital down-conversion unit, configured to receive the fourth processed signal, convert the fourth processed signal into a digital signal, and perform digital down-conversion processing on the digital signal to acquire a fifth processed signal; wherein
the second-type interference reconstructor is further configured to acquire a digital baseband reference signal, receive the fifth processed signal transmitted by the digital down-conversion unit, and perform self-interference channel estimation according to the fifth processed signal and the digital baseband reference signal to acquire the self-interference channel parameter.

2. The apparatus according to claim 1, wherein the second-type interference reconstructor comprises:
a self-interference estimation module, configured to acquire the digital baseband reference signal, receive the fifth processed signal transmitted by the digital down-conversion unit, and perform self-interference channel estimation according to the digital baseband reference signal and the fifth processed signal to acquire the self-interference channel parameter; and
a self-interference signal reconstruction module, configured to acquire the second local-frequency signal generated by the local-frequency signal generator, receive the radio frequency reference signal acquired by the divider (120) and the self-interference channel parameter acquired by the self-interference estimation module, and reconstruct the self-interference signal according to the self-interference channel parameter, the radio frequency reference signal, and the second local-frequency signal.

3. The apparatus according to claim 1, further comprising a first amplifier, wherein the first amplifier is configured to amplify the fourth processed signal.

4. The apparatus according to claim 1, further comprising a second amplifier and a third amplifier, wherein:
the second amplifier is configured to amplify the first processed signal; and
the third amplifier is configured to amplify the reconstructed self-interference signal.

5. The apparatus according to claim 1, further comprising a second amplifier and a fourth amplifier, wherein:
the second amplifier is configured to amplify the first processed signal; and the fourth amplifier is configured to amplify the radio frequency reference signal received by the second-type interference reconstructor.

6. The apparatus according to claim 2, wherein the self-interference signal reconstruction module comprises:
a first power divider, a first attenuator group, a first mixer group, a first low-pass filter group, and a first delayer group, wherein:
the first power divider is configured to receive the radio frequency reference signal, and divide the radio frequency reference signal into at least one signal;
the first attenuator group comprises at least one attenuator, wherein the attenuator is configured to perform attenuation processing on one of the at least one radio frequency reference signal according to the self-interference channel parameter;
the first mixer group comprises at least one mixer, wherein the mixer is configured to perform, according to the second local-frequency signal, frequency mixing processing on one of the radio frequency reference signal after attenuation processing;
the first low-pass filter group comprises at least one low-pass filter, wherein the low-pass filter is configured to perform filtering processing on one of the radio frequency reference signal after frequency mixing processing; and
the first delayer group comprises at least one delayer and at least one combiner, wherein: the at least one delayer is connected in series by using a first input end and an output end of a combiner, an input end of a first delayer and a second input end of the combiner are configured to input one radio frequency reference signal after filtering processing, and an output end of a last combiner is configured to output the reconstructed self-interference signal.

7. The apparatus according to claim 2, wherein the self-interference signal reconstruction module comprises:
a second power divider, a second mixer group, a second low-pass filter group, a second attenuator group, and a second delayer group, wherein:
the second power divider is configured to receive the radio frequency reference signal, and divide the radio frequency reference signal into at least one signal;
the second mixer group comprises at least one mixer, wherein the mixer is configured to perform frequency mixing processing on one of the radio frequency reference signal according to the second local-frequency signal;
the second low-pass filter group comprises at least one low-pass filter, wherein the low-pass filter is configured to perform filtering processing on one of the radio frequency reference signal after frequency mixing processing;
the second attenuator group comprises at least one attenuator, wherein the attenuator is configured to perform, according to the self-interference channel parameter, attenuation processing on one of the radio frequency reference signal after filtering processing; and
the second delayer group comprises at least one delayer and at least one combiner, wherein: the at least one delayer is connected in series by using a first input end and an output end of a combiner, an input end of a first delayer and a second input end of the combiner are configured to input one radio frequency reference signal after attenuation processing, and an input end of a last combiner is configured to output the reconstructed self-interference signal.

8. The apparatus according to claim 1, wherein the local-frequency signal generator comprises a local-frequency signal source, a third power divider, and a phase shifter group, wherein:
the third power divider is configured to divide a local-frequency signal transmitted by the local-frequency signal source into at least one local-frequency signal, wherein one local-frequency signal is used as the first local-frequency signal, and the other local-frequency signals are input to the phase shifter group; and
the phase shifter group comprises at least one phase shifter, wherein the phase shifter is configured to perform phase shift processing on one local-frequency signal according to the self-interference channel parameter, and the phase shifter group uses each local-frequency signal obtained after phase shift processing as the second local-frequency signal.

9. The apparatus according to any one of claim 1, wherein:
the first-type interference canceller is specifically configured to perform, based on the received radio frequency signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the received radio frequency signal, and that a phase of the radio frequency reference signal is the same or approximately the same as a phase of the first-type self-interference component in the received radio frequency signal; or
perform, based on the received radio frequency signal, delay processing, amplitude adjustment processing, and phase adjustment processing on the radio frequency reference signal, so that an amplitude of the radio frequency reference signal is the same or approximately the same as an amplitude of the first-type self-interference component in the received radio frequency signal, and that a difference between a phase of the radio frequency reference signal and a phase of the first-type self-interference component in the received radio frequency signal is 180 degrees or approximately 180 degrees.

10. The apparatus according to any one of claim 1, wherein the interference cancellation apparatus is a base station or an access terminal of a base station.

11. The apparatus according to claim 2, wherein the self-interference estimation module comprises a field-programmable gate array FPGA, a central processing unit CPU, or application-specific integrated circuit ASIC.

12. An interference cancellation method, comprising:
acquiring a radio frequency reference signal generated according to a transmit signal;
receiving a radio frequency signal by using a main receive antenna;
canceling a first-type self-interference component in the received radio frequency signal according to the radio frequency reference signal, to generate a first processed signal, wherein the first-type self-interference component comprises a main-path self-interference component;
generating a first local-frequency signal and a second local-frequency signal according to a self-interference channel parameter;

performing frequency mixing processing on the first local-frequency signal and the first processed signal to acquire a second processed signal;

performing filtering processing on the second processed signal to acquire a third processed signal;

acquiring a reconstructed self-interference signal according to the self-interference channel parameter, the radio frequency reference signal, and the second local-frequency signal;

canceling a second-type self-interference signal in the third processed signal according to the reconstructed self-interference signal to generate a fourth processed signal;

converting the fourth processed signal into a digital signal, and performing digital down-conversion processing on the digital signal to acquire a fifth processed signal; and performing self-interference channel estimation according to the fifth processed signal and a digital baseband reference signal to acquire the self-interference channel parameter.

13. The method according to claim 12, wherein the method further comprises: amplifying the fourth processed signal.

14. The method according to claim 12, wherein the method further comprises:
amplifying the first processed signal; and
amplifying the reconstructed self-interference signal.

15. The method according to claim 12, wherein the method further comprises:
amplifying the first processed signal; and
before the acquiring the reconstructed self-interference signal according to the self-interference channel parameter, the radio frequency reference signal, and the second local-frequency signal, the method further comprises: amplifying the radio frequency reference signal.

16. The method according to claim 12, wherein the acquiring the reconstructed self-interference signal according to the self-interference channel parameter, the radio frequency reference signal, and the second local-frequency signal comprises:
dividing the radio frequency reference signal into at least one signal;
performing attenuation processing on each radio frequency reference signal according to the self-interference channel parameter;
performing, according to the second local-frequency signal, frequency mixing processing on each radio frequency reference signal after attenuation processing;
performing filtering processing on each radio frequency reference signal after frequency mixing processing; and
performing delay processing on each of the radio frequency reference signal after filtering processing, and performing combination to reconstruct the self-interference signal.

17. The method according to claim 12, wherein the acquiring the reconstructed self-interference signal according to the self-interference channel parameter, the radio frequency reference signal, and the second local-frequency signal comprises:
dividing the radio frequency reference signal into at least one signal;

performing frequency mixing processing on each of the radio frequency reference signal according to the second local-frequency signal;

performing filtering processing on each of the radio frequency reference signal after frequency mixing processing;

performing, according to the self-interference channel parameter, attenuation processing on each of the radio frequency reference signal after filtering processing; and performing delay processing on each of the radio frequency reference signal after attenuation processing, and combing the radio frequency reference signal to reconstruct the self-interference signal.

18. The method according to claim 12, wherein the generating a first local-frequency signal and a second local-frequency signal according to a self-interference channel parameter comprises:
dividing a local-frequency signal into at least one local-frequency signal, wherein one local-frequency signal is used as the first local-frequency signal; and
performing phase shift processing on each local-frequency signal except the first local-frequency signal according to the self-interference channel parameter to generate the second local-frequency signal.

19. The method according to any one of claim 12, wherein canceling a first-type self-interference component in the received radio frequency signal according to the radio frequency reference signal comprises:
performing, based on the received radio frequency signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the received radio frequency signal, and that a phase of the radio frequency reference signal is the same or approximately the same as a phase of the first-type self-interference component in the received radio frequency signal; or
performing, based on the received radio frequency signal, delay processing, amplitude adjustment processing, and phase adjustment processing on the radio frequency reference signal, so that an amplitude of the radio frequency reference signal is the same or approximately the same as an amplitude of the first-type self-interference component in the received radio frequency signal, and that a difference between a phase of the reference signal and a phase of the first-type self-interference component in the received radio frequency signal is 180 degrees or approximately 180 degrees.

20. The method according to any one of claim 12, wherein the transmit signal comprises a self-interference channel estimation timeslot and a data transmission timeslot that are disposed at an interval.

* * * * *